United States Patent
Heap et al.

(10) Patent No.: US 8,221,285 B2
(45) Date of Patent: Jul. 17, 2012

(54) METHOD AND APPARATUS TO OFFLOAD OFFGOING CLUTCH TORQUE WITH ASYNCHRONOUS ONCOMING CLUTCH TORQUE, ENGINE AND MOTOR TORQUE FOR A HYBRID POWERTRAIN SYSTEM

(75) Inventors: Anthony H. Heap, Ann Arbor, MI (US); Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 945 days.

(21) Appl. No.: 12/251,463

(22) Filed: Oct. 15, 2008

(65) Prior Publication Data

US 2009/0118086 A1    May 7, 2009

Related U.S. Application Data

(60) Provisional application No. 60/985,285, filed on Nov. 4, 2007.

(51) Int. Cl.
  *B60W 10/02*  (2006.01)
  *B60W 10/06*  (2006.01)
  *B60W 10/08*  (2006.01)
(52) U.S. Cl. .............. 477/5; 477/83; 477/180; 477/181
(58) Field of Classification Search ............... 477/5, 77, 477/83, 180, 181
  See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 7,722,497 B2 * | 5/2010 | Tabata et al. | 477/3 |
| 7,744,502 B2 * | 6/2010 | Dreibholz et al. | 477/5 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |

(Continued)

FOREIGN PATENT DOCUMENTS

WO    WO-2005080112 A1    9/2005

*Primary Examiner* — Edwin A Young

(57) ABSTRACT

A powertrain includes an electromechanical transmission mechanically-operatively coupled to an internal combustion engine and an electric machine adapted to selectively transmit mechanical power to an output member. A method for controlling the powertrain includes commanding a shift from a first operating range state to a second operating range state, identifying an off-going clutch, controlling torque output from said electric machine to offload reactive torque transmitted through said off-going clutch, selectively applying an oncoming clutch to offload reactive torque transmitted through said off-going clutch, and reducing a clutch torque capacity of said off-going clutch when said reactive torque transmitted through said off-going clutch is substantially zero.

15 Claims, 13 Drawing Sheets

U.S. PATENT DOCUMENTS

| | | |
|---|---|---|
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2006/0258506 A1* | 11/2006 | Ibamoto et al. .................. 477/5 |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |

| | | |
|---|---|---|
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

\* cited by examiner

METHOD AND APPARATUS TO OFFLOAD OFFGOING CLUTCH TORQUE WITH ASYNCHRONOUS ONCOMING CLUTCH TORQUE, ENGINE AND MOTOR TORQUE FOR A HYBRID POWERTRAIN SYSTEM

CROSS REFERENCE TO RELATED APPLICATIONS

This application claims the benefit of U.S. Provisional Application No. 60/985,285 filed on Nov. 4, 2007 which is hereby incorporated herein by reference.

TECHNICAL FIELD

This disclosure pertains to control systems for electromechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate an input torque to the transmission, independently of an input torque from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

Transmissions within a hybrid powertrain, as described above, serve a number of functions by transmitting and manipulating torque in order to provide torque to an output member. In order to serve the particular function required, the transmission selects between a number of operating range states or configurations internal to the transmission defining the transfer of torque through the transmission. Known transmissions utilize operating range states including fixed gear states or states with a defined gear ratio. For example, a transmission can utilize four sequentially arranged fixed gear states and allow selection between the four gear states in order to provide output torque through a wide range of output member speeds. Additively or alternatively, known transmissions also allow for continuously variable operating range states or mode states, enabled for instance through the use of a planetary gear set, wherein the gear ratio provided by the transmission can be varied across a range in order to modulate the output speed and output torque provided by a particular set of inputs. Additionally, transmissions can operate in a neutral state, ceasing all torque from being transmitted through the transmission. Additionally, transmissions can operate in a reverse mode, accepting input torque in a particular rotational direction used for normal forward operation and reversing the direction of rotation of the output member. Through selection of different operating range states, transmissions can provide a range of outputs for a given input.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. However, changes in output torque required from the transmission, for instance, due to a change in operator pedal position or due to an operating range state shift, must be handled smoothly. Particularly difficult to manage are input torques, applied simultaneously to a transmission, with different reaction times to a control input. Based upon a single control input, the various devices can change respective input torques at different times, causing increased abrupt changes to the overall torque applied through the transmission. Abrupt or uncoordinated changes to the various input torques applied to a transmission can cause a perceptible change in acceleration or jerk in the vehicle, which can adversely affect vehicle drivability.

Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches. Clutches are devices well known in the art for engaging and disengaging shafts including the management of rotational velocity and torque differences between the shafts. Engagement or locking, disengagement or unlocking, operation while engaged or locked operation, and operation while disengaged or unlocked operation are all clutch states that must be managed in order for the vehicle to operate properly and smoothly.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. Clamping force applied to the clutch determines how much reactive torque the clutch can carry before the clutch slips. Variable control of clutches through modulation of clamping force allows for transition between locked and unlocked states and further allows for managing slip in a locked transmission. In addition, the maximum clamping force capable of being applied by the hydraulic lines can also vary with vehicle operating states and can be modulated based upon control strategies.

Clutches are known to be operated asynchronously, designed to accommodate some level of slip in transitions between locked and unlocked states. Other clutches are known to be operated synchronously, designed to match speeds of connective surfaces or synchronize before the connective surfaces are clamped together. This disclosure deals primarily with clutches designed for primarily synchronous operation.

Slip, or relative rotational movement between the connective surfaces of the clutch when the clutch connective surfaces are intended to be synchronized and locked, occurs whenever reactive torque applied to the clutch exceeds actual torque capacity created by applied clamping force. Slip in a transmission utilizing clutches designed for synchronous operation results in unintended loss of torque control within the transmission, results in loss of engine speed control and electric machine speed control caused by a sudden change in back-torque from the transmission, and results in sudden changes to vehicle acceleration, creating adverse affects to drivability.

Transmissions can operate with a single clutch transmitting reactive torque between inputs and an output. Transmission can operate with a plurality of clutches transmitting reactive torque between inputs and an output. Selection of operating range state depends upon the selective engagement of clutches, with different allowable combinations resulting in different operating range states.

Transition from one operating state range to another operating state range involves transitioning at least one clutch state. An exemplary transition from one fixed gear state to another involves unloading a first clutch, transitioning through a freewheeling, wherein no clutches remain engaged, or inertia speed phase state, wherein at least one clutch remains engaged, and subsequently loading a second clutch. A driveline connected to a locked and synchronized clutch, prior to being unloaded, is acted upon by an output torque resulting through the transmission as a result of input torques and reduction factors present in the transmission. In such a torque transmitting state, the transmission so configured during a shift is said to be in a torque phase. In a torque phase, vehicle speed and vehicle acceleration are functions of the output torque and other forces acting upon the vehicle. Unloading a clutch removes all input torque from a previously locked and synchronized clutch. As a result, any propelling force previously applied to the output torque through that clutch is quickly reduced to zero. In one exemplary configuration, another clutch remains engaged and transmitting torque to the output while the transmission synchronizes the second clutch. In such a configuration, the transmission is in an inertia speed phase. As the second clutch to be loaded is synchronized and loaded, the transmission again enters a torque phase, wherein vehicle speed and vehicle acceleration are functions of the output torque and other forces acting upon the vehicle. While output torque changes or interruptions due to clutch unloading and loading are a normal part of transmission operating range state shifts, orderly management of the output torque changes reduces the impact of the shifts to drivability.

As described above, slip in a clutch designed for synchronous operation is frequently an undesirable result. However, particular clutch designs may still allow controlled slip within an otherwise synchronous control scheme top achieve particular goals. An exemplary goal in which controlled slip could be useful is in assisting control of reactive torque through an unloading torque phase of an off-going clutch. A method to utilize a synchronous clutch through a controlled slip event to assist in control of through a torque phase would be beneficial to aspects of clutch operation.

SUMMARY

A powertrain includes an electromechanical transmission mechanically-operatively coupled to an internal combustion engine and an electric machine adapted to selectively transmit mechanical power to an output member. A method for controlling the powertrain includes commanding a shift from a first operating range state to a second operating range state, identifying an off-going clutch, controlling torque output from said electric machine to offload reactive torque transmitted through said off-going clutch, selectively applying an oncoming clutch to offload reactive torque transmitted through said off-going clutch, and reducing a clutch torque capacity of said off-going clutch when said reactive torque transmitted through said off-going clutch is substantially zero.

BRIEF DESCRIPTION OF THE DRAWINGS

One or more embodiments will now be described, by way of example, with reference to the accompanying drawings, in which:

FIG. 5 is a graphical representation of torque terms associated with a clutch through an exemplary transitional unlocking state;

FIG. 6 is a graphical representation of torque terms associated with a clutch through an exemplary transitional locking state;

FIG. 7 is a graphical representation of terms describing an exemplary inertia speed phase of a transmission, in accordance with the present disclosure;

FIG. 11 is an exemplary synchronous shift, as described in the exemplary embodiments disclosed herein;

FIG. 12 is an exemplary asynchronous shift to provide $T_C$ through the shift in order to assist changes to $N_I$;

DETAILED DESCRIPTION

Figure 1:
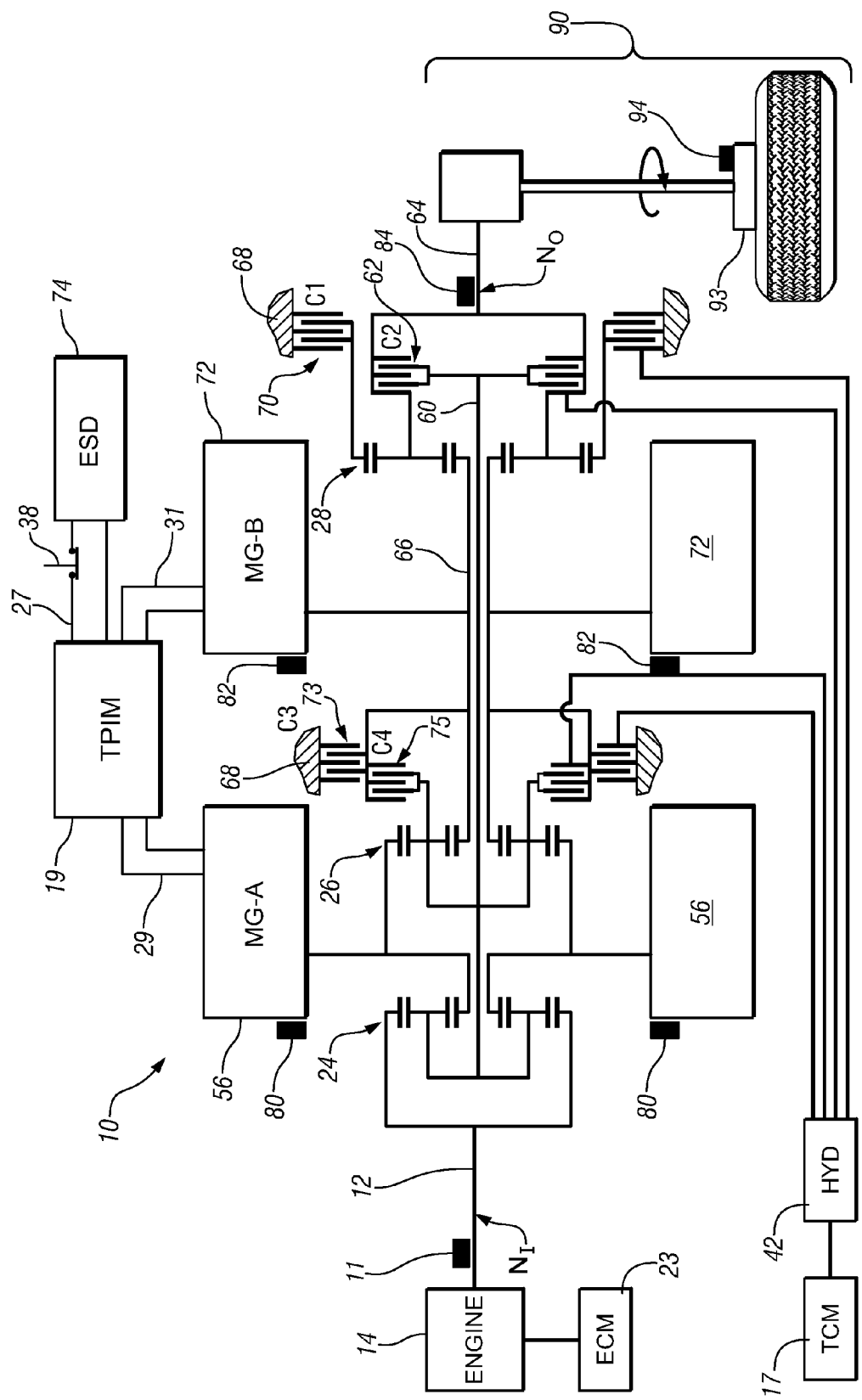
FIG. 1 is a schematic diagram of an exemplary powertrain comprising a two-mode, compound-split, electromechanical hybrid transmission operatively connected to an engine and first and second electric machines, in accordance with the present disclosure.
Figure 2:
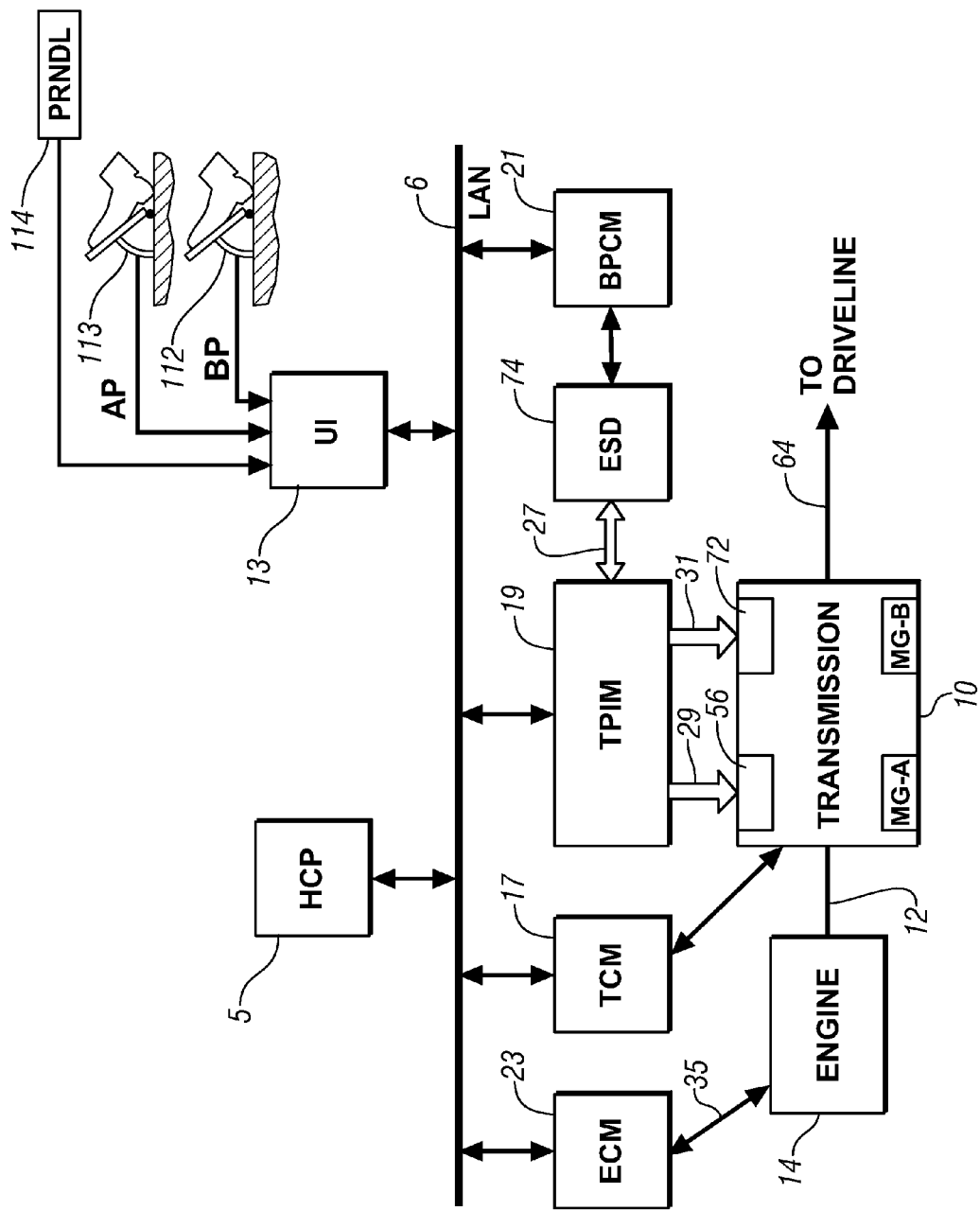
FIG. 2 is a schematic block diagram of an exemplary distributed control module system, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque requests to the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque request, clutch torques for the torque-transfer clutches C1 70, C2 62, C3 73, C4 75 of the transmission 10; and the torque requests for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque request from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine, initiated for example within a hybrid strategic control module of the HCP 5, which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transmit power therebetween to generate a power flow to the output member 64.

As discussed above, managing output torque in order to maintain drivability is a priority in controlling a hybrid powertrain. Any change in torque in response to a change in output torque request applied through the transmission results in a change to the output torque applied to the driveline, thereby resulting in a change in propelling force to the vehicle and a change in vehicle acceleration. The change in torque request can come from operator input, such a pedal position relating an operator torque request, automatic control changes in the vehicle, such as cruise control or other control strategy, or engine changes in response to environmental conditions, such as a vehicle experiencing an uphill or downhill grade. By controlling changes to various input torques applied to a transmission within a hybrid powertrain, abrupt changes in vehicle acceleration can be controlled and minimized in order to reduce adverse effects to drivability.

As is known by one having ordinary skill in the art, any control system includes a reaction time. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in operator torque request or as required to execute a transmission shift, creates reactions in each affected torque generating device in order to execute the required changes to respective input torques. Changes to input torque supplied from an engine are controlled by an engine torque request setting the torque generated by the engine, as controlled, for example, through an ECM. Reaction time within an engine to changes in torque request to an engine is impacted by a number of factors well known in the art, and the particulars of a change to engine operation depend heavily on the particulars of the engine employed and the mode or modes of combustion being utilized. In many circumstances, the reaction time of an engine to changes in torque request will be the longest reaction time of the components to the hybrid drive system. Reaction time within an electric machine to changes in torque request include time to activate any necessary switches, relays, or other controls and time to energize or de-energize the electric machine with the change in applied electrical power.

Figure 3:
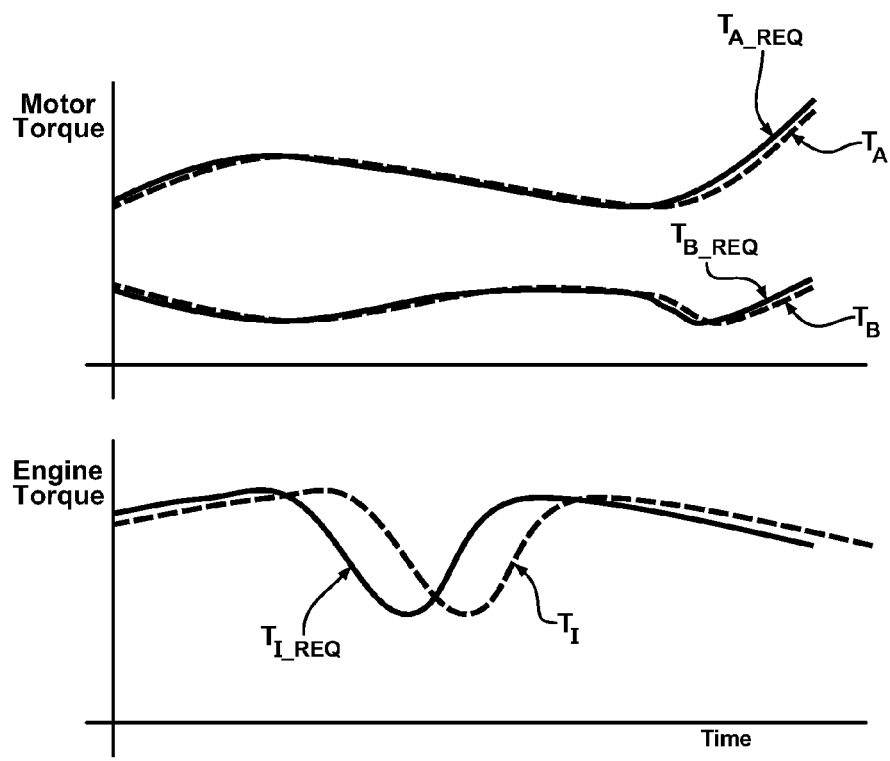
FIG. 3 graphically depicts reaction times of exemplary hybrid powertrain components to changes in torque request, in accordance with the present disclosure.

FIG. 3 graphically depicts reaction times of exemplary hybrid powertrain components to changes in torque request, in accordance with the present disclosure. Components to an exemplary hybrid powertrain system including an engine and two electric machines are exemplified. Torque requests and resulting changes in input torque produced by each torque generating device are illustrated. As described above, the data shows that electric machines quickly respond to changes in torque requests, whereas the engine follows changes in torque requests more slowly.

A method is disclosed wherein reactions times of the engine and of the electric machine or machines within a hybrid powertrain are utilized to control in parallel an lead immediate torque request, controlling the engine, and an immediate torque request, controlling the electric machines, the torque requests being coordinated by respective reaction times in order to substantially effect simultaneous changes to input torque.

Because, as discussed above, changes to input torque from the engine are known to involve consistently longer reactions times than changes to input torque from an electric machine, an exemplary embodiment of the disclosed method can implement changes in torque request to the engine and the electric machine, acting in parallel as described above, including a lead period to the more quickly reacting device, the electric motor. This lead period may be developed experimentally, empirically, predictively, through modeling or other techniques adequate to accurately predict engine and electric machine operation, and a multitude of lead periods might be used by the same hybrid powertrain, depending upon different engine settings, conditions, operating and ranges and vehicle conditions. An exemplary equation that can be used in conjunction with test data or estimates of device reaction times to calculate lead period in accordance with the present disclosure includes the following.

$$T_{Lead} = T_{Lead\ Reaction} - T_{Immediate\ Reaction} \quad [1]$$

$T_{Lead}$ equals the lead period for use in methods described herein. This equation assumes that two torque producing devices are utilized. $T_{Lead\ Reaction}$ represents the reaction time of the device with the longer reaction time, and $T_{Immediate\ Reaction}$ represents the reaction time of the device with the shorter reaction time. If a different system is utilized, comprising for example, an engine with a long lead period, a first electric machine with an intermediate lead period, and a second electric machine with a short lead period, lead periods can be developed comparing all of the torque generating devices. In this exemplary system, if all three torque generating devices are involved, two lead periods, one for the engine as compared to each of the electric machines, will be utilized to synchronize the responses in each of the devices. The same system at a different time might be operating with the engine off and disengaged from the transmission, and a lead period comparing the first electric machine and the second electric machine will be utilized to synchronize the responses in the two electric machines. In this way, a lead period can be developed coordinating reaction times between various torque generating devices can be developed.

One exemplary method to utilize lead periods to implement parallel torque requests to distinct torque generating devices in order to effect substantially simultaneous changes to output torque in response to a change in operator torque request includes issuing substantially immediately a change to the engine torque immediate request, initiating within the engine a change to a new engine output torque. This new engine output torque, in conjunction with the electric motor operating state, is still managed by the HCP in order to provide some portion of the total input torque to the transmission required to propel the vehicle. From the point that the engine torque immediate request changes, the lead period expires, described above taking into account the differences in reaction times between the engine and the electric machine. After the lead period, a change to torque requests issued to the electric machine or machines, managed by the HCP in order to fulfill a portion of the operator torque request, is executed, and the electric machine changes the electric machine operating state, and as described above, the changes to the input torques provided by the engine and the electric machine change substantially simultaneously.

As described in the disclosed method above, engine torque immediate requests and torque requests to an electric machine are disclosed for use in parallel to control distinct torque generative devices with different reaction times to reaction to changes in operator torque request. Changes in operator torque request can include a simple change in desired output torque within a particular transmission operating range state, or changes in operator torque request can be required in conjunction with a transmission shift between different operating range states. Changes to operator torque requests in conjunction with a transmission shift are more complex than changes contained within a single operating range state because torques and shaft speeds of the various hybrid powertrain components must be managed in order to transition torque applied from a first clutch and to a second previously not applied clutch without the occurrence of slip, as described above.

Figure 4:
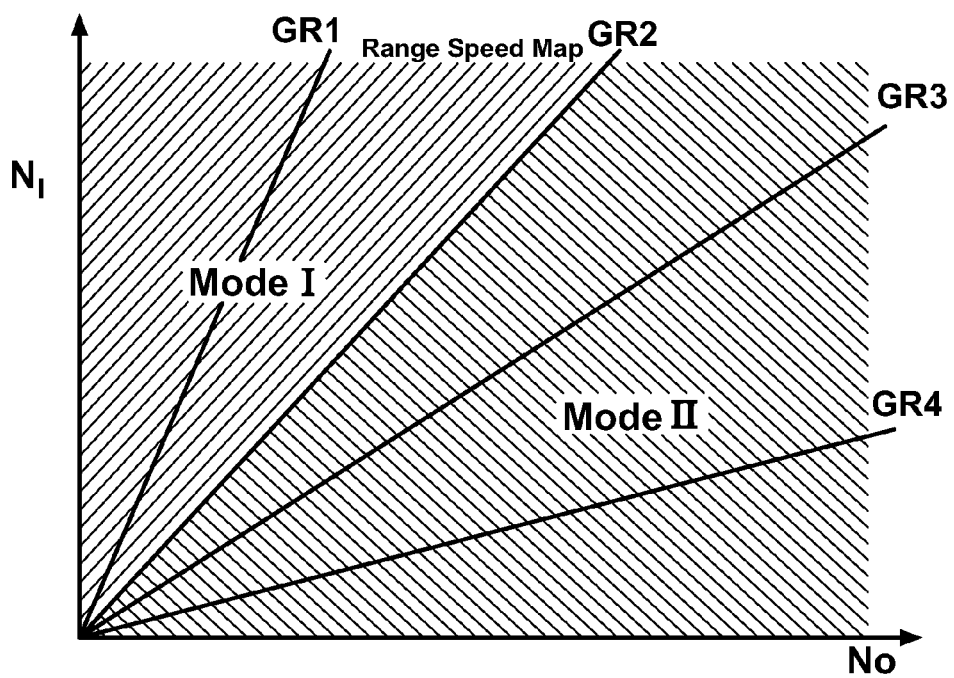
FIG. 4 demonstrates gear transition relationships for an exemplary hybrid powertrain transmission, in particular as described in the exemplary embodiment of FIG. 1 and Table 1, in accordance with the present disclosure.

Shifts within a transmission, such as the exemplary transmission of FIG. 1, frequently involve unloading a first clutch, transitioning through an inertia speed phase state, and subsequently loading a second clutch. Within the transmission of a conventionally powered vehicle utilizing an engine only, the change within a transmission from one fixed gear state to another fixed gear state frequently includes unloading a first clutch, allowing the vehicle to briefly coast, and then loading a second clutch. However, as described in relation to FIG. 1 and Table 1, above, clutches within a hybrid powertrain transmission are frequently applied in pairs or groups, and a shift within the transmission can involve only unloading one of the applied clutches and subsequently loading another clutch while maintaining engagement of a third clutch throughout the shift. FIG. 4 demonstrates gear transition relationships for an exemplary hybrid powertrain transmission, in particular as described in the exemplary embodiment of FIG. 1 and Table 1, in accordance with the present disclosure. $N_I$ is plotted against $N_O$. At any fixed gear state, $N_O$ is determined by the corresponding $N_I$ along the fixed gear state plots. Operation in either EVT Mode I or EVT Mode II, wherein a continuously variable gear ratio is utilized to power from a fixed input speed can take place in the respective zones illustrated on the graph. Clutch states, C1-C4, as described in the exemplary embodiment of FIG. 1, are described in Table 1. For instance, operation in a second fixed gear state requires clutches C1 and C2 to be applied or loaded and clutches C3 and C4 to be not applied or unloaded. While FIG. 4 describes gear transitions possible in the exemplary powertrain illustrated in FIG. 1, it will be appreciated by one having ordinary skill in the art that such a description of gear transitions is possible for any transmission of a hybrid powertrain, and the disclosure is not intended to be limited to the particular embodiment described herein.

FIG. 4 can describe operation of an exemplary system in a fixed gear state or EVT mode, as described above, and it can also be used to describe shift transitions between the various transmission operating range states. The areas and plots on the graph describe operation of the operating range states through transitions. For example, transitions between fixed gear states within an EVT mode region require transitory operation in the EVT mode between the fixed gear states. Similarly, transition from EVT Mode I to EVT Mode II requires a transition through the second fixed gear state, located at the boundary between the two modes.

In accordance with FIGS. 1 and 4 and Table 1, an exemplary transmission shift from a third fixed gear state to a fourth fixed gear state is further described. Referring to FIG. 4, both the beginning and the preferred operating range states exist within the area of EVT Mode II. Therefore, a transition from the third gear state to the fourth gear state requires first a shift from the third fixed gear state to EVT Mode II and then a shift from EVT Mode II to the fourth fixed gear state. Referring to Table 1, a hybrid powertrain transmission, beginning in a third fixed gear state, will have clutches C2 and C4 applied. Table 1 further describes operation in EVT Mode II, the destination of the first shift, to include clutch C2 applied. Therefore, a shift from the third fixed gear state to EVT Mode II requires clutch C4 to be changed from an applied to a not applied state and requires that clutch C2 remain applied. Additionally, Table 1 describes operation in the fourth fixed gear mode, the destination of the second shift, wherein clutches C2 and C3 are applied. Therefore, a shift from EVT Mode II to the fourth fixed gear state requires clutch C3 to be applied and loaded and requires that clutch C2 remain applied. Therefore, clutches C4 and C3 are transitioned through the exemplary shift, while clutch C2 remains applied and transmitting torque to the driveline throughout the shift event.

Applied to the methods disclosed herein, changes in input torque through a transmission shift can be adjusted to reduce negative effects to drivability by coordinating signal commands to various torque generative devices based upon reaction times of the various components. As described above, many transmission shifts can be broken down into three phases: a first torque phase, during which an initially applied clutch is changed from a torque-bearing, locked, and synchronized clutch state to an unlocked and desynchronized clutch state; an inertia speed phase, during which affected clutches are unlocked and in transitional states; and a second torque phase, during which a second previously not applied clutch is changed from an unlocked and desynchronized clutch state to a torque-bearing, locked, and synchronized clutch state. As aforementioned, clutch slip is preferably avoided throughout transmission shifts to avoid adverse effects on drivability, and clutch slip is created when reactive torque applied across a clutch exceeds the actual torque capacity of the clutch. Therefore, within a transmission shift event, input torques must be managed in relation to the actual torque capacity of the currently applied clutch, such that the transmission shift can be accomplished without the occurrence of slip.

Figure 5:
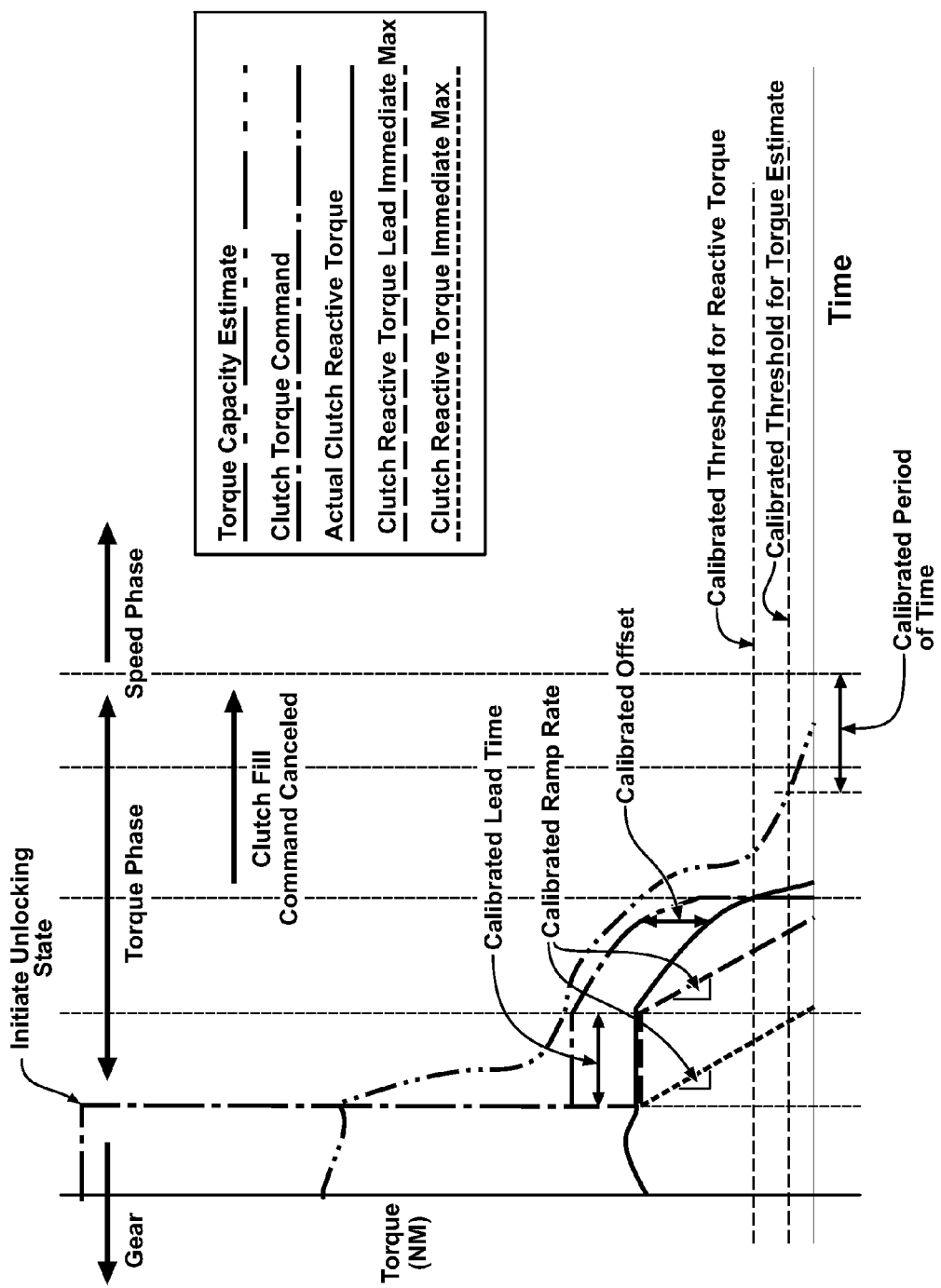
FIGS. 5-7 depict exemplary processes combining to accomplish an exemplary transmission shift, in accordance with the present disclosure.
Figure 6:
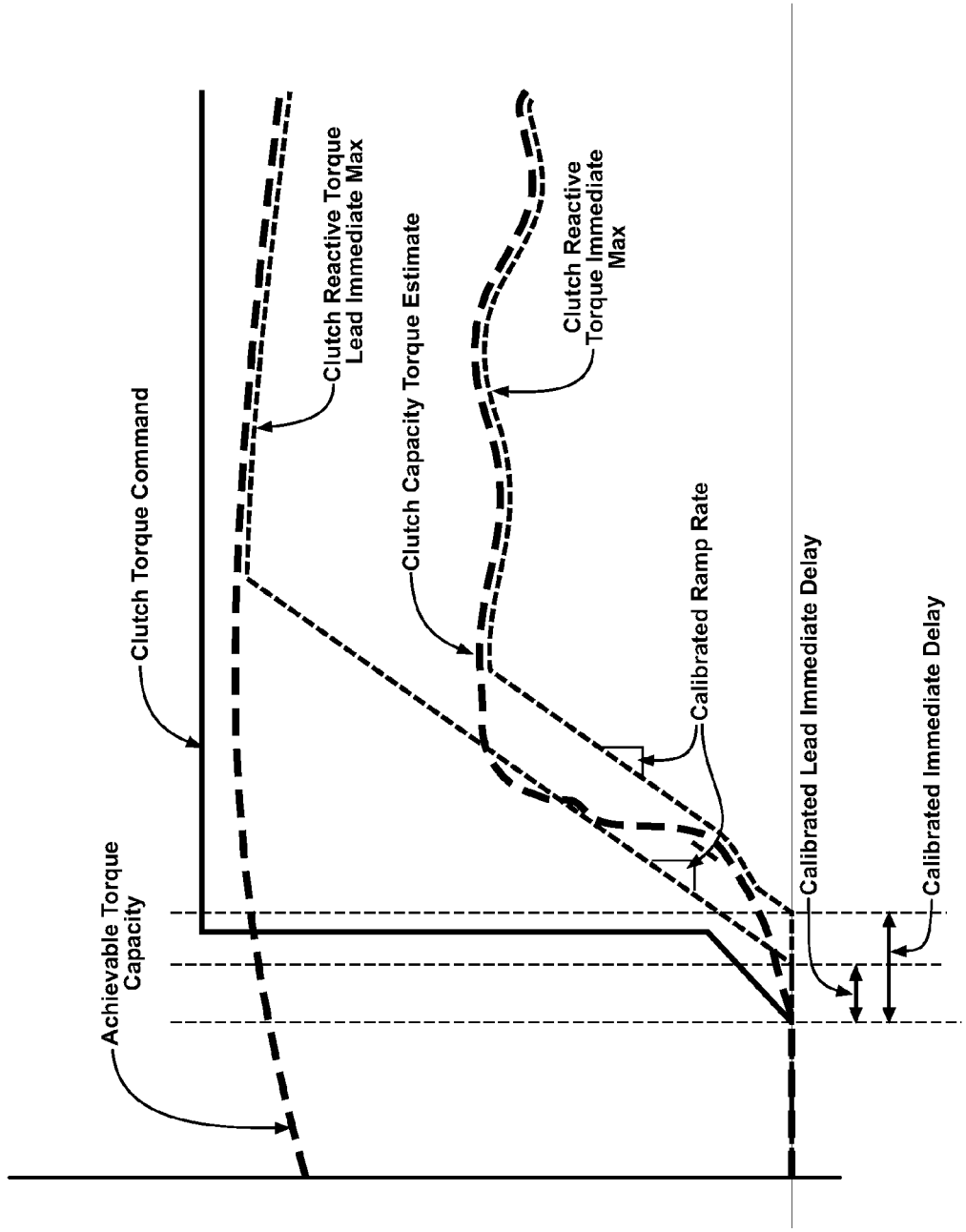
Figures 7, 8:
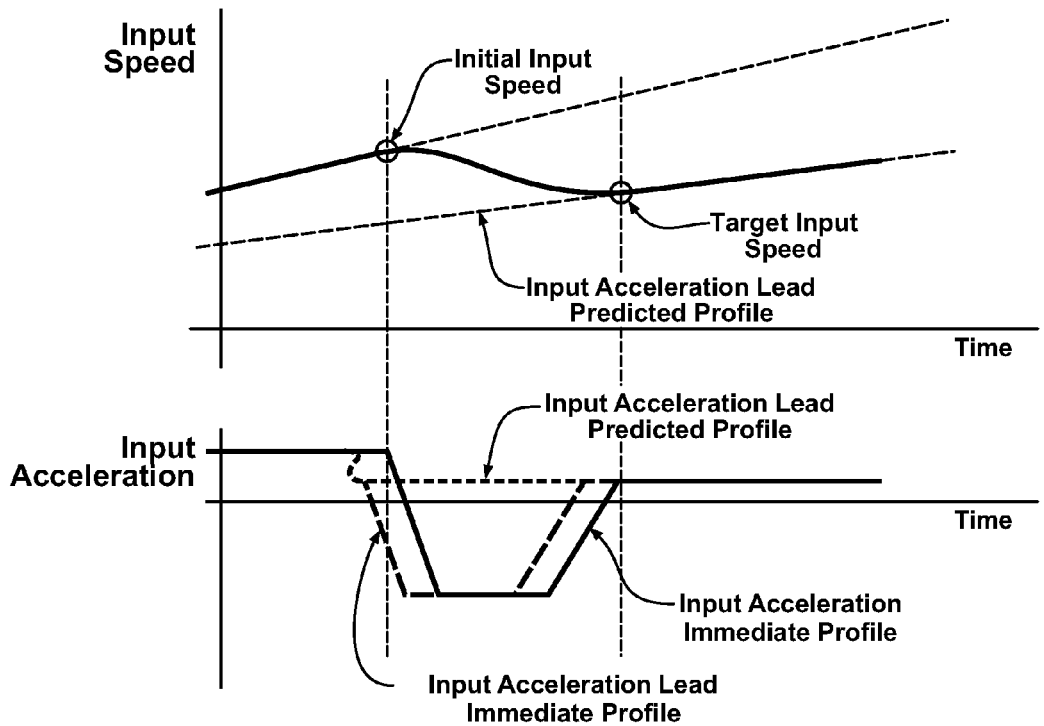
FIG. 8 illustrates in tabular form use of an exemplary 2D look-up table to determine inertia speed phase times, in accordance with the present disclosure.

While a process can be utilized to perform necessary steps in a clutch loading or unloading event in sequence, with the torque capacity of the clutch being maintained in excess of reactive torques, time involved in an unlocking transition is also important to drivability. Therefore, it is advantageous to perform associated torque requests and clutch capacity commands in parallel while still acting to prevent slip. Such parallel implementation of control changes intending to effect clutch state changes associated with a transmission shift preferably occur in as short of a time-span as possible. Therefore, coordination of torque capacity within the clutches involved in the transmission shift to the torque requests, both to the engine and to the electric machine, as described in the exemplary embodiment above, is also important to maintaining drivability through a transmission shift. FIGS. 5-7 depict exemplary processes combining to accomplish an exemplary transmission shift, in accordance with the present disclosure.

FIG. 5 is a graphical representation of torque terms associated with a clutch through an exemplary transitional unlocking state, in accordance with the present disclosure. Lines illustrated at the left extreme of the graph depict clutch operation in a locked state. The graph depicts clutch command torque by a clutch control system and a resulting estimated torque capacity. Clutch torque capacity in a clutch resulting from a command torque is a result of many factors, including available clamping pressure, design and conditional factors of the clutch, reaction time in the clutch to changes in the clutch control system. As demonstrated in the exemplary data of the graph in the initial locked region, it is known to command a torque to a locked clutch in excess of the clutch capacity and allow the other factors affecting the clutch to determine the resulting clutch capacity. Also at the left extreme of the graph depicting clutch operation in a locked state, estimated reactive torque applied to the clutch as a result of input torque from the engine and electric machine torques is depicted. At the time labeled "Initiate Unlocking State", logic within the clutch control system or the TCM, having determined a need to transition the clutch from locked to unlocked states, changes the command torque to some level lower than the torque capacity but still higher than the reactive torque currently applied to the clutch. At this point, mechanisms within the clutch control system, for example, variable pressure control solenoids within an exemplary hydraulic clutch control system, change settings to modulate the clamping force within the clutch. As a result, torque capacity of the clutch begins to change as the clamping force applied to the clutch changes. As discussed above, the clutch reacts to a change in command torque over a reaction time, and reaction time for a particular clutch will depend upon the particulars of the application. In the exemplary graph of FIG. 5, torque capacity reacts to a reduction in command torque and begins to reduce accordingly.

As mentioned above, during the same unlocking state, reactive torque resulting from input torque and electric machine torques must also be unloaded from the clutch. Undesirable slip results if the reactive torque is not maintained below the torque capacity throughout the unlocking state. Upon initiation of the unlocking state, at substantially the same point on FIG. 5 where the torque capacity is reduced to initiate the unlocking state, limits are initiated and imposed upon input torques from the engine and the electric machine in order to accomplish a ramping down of each to zero. As described in the method disclosed herein and in exemplary embodiments described above, changes to limits including a engine torque immediate request and an immediate torque request are executed in a coordinated process, implementing a lead period calibrated to the reaction times of the various torque providing devices, such that the resulting input torques from the devices are reduced substantially simultaneously. FIG. 5 illustrates a method to perform this coordinated change to torque requests by imposing limits upon torque requests in the form of a clutch reactive torque lead immediate minimum and maximum constraining the engine torque immediate request and a clutch reactive torque immediate minimum and maximum constraining the torque request to the electric machine. These maximum reactive torque values represent the maximum torque that is permitted to be commanded from each torque providing device: the actual engine torque immediate request and the actual immediate torque request can be less than the maximum reactive torque values, but as the maximum values reduce, so the actual torque request values will also eventually reduce. The input torques from the engine and electric machine together provide, each up to the defined maximum values, some portion of the overall input torques, with the portion of each being controlled by the HCP. As a result of the calibrated lead period, both the clutch reactive torque lead immediate minimum and maximum and the clutch reactive torque immediate minimum and maximum reduce applied reactive torque to the clutch at substantially the same time, resulting in the reduction to the actual clutch reactive torque as illustrated in FIG. 5. As will be appreciated by one having ordinary skill in the art, other safeguards will additionally need to be utilized to ensure that the torque capacity remains in excess of the reactive torque throughout the unloading process. Many such methods are contemplated, and an exemplary set of terms which might be used are depicted on FIG. 5. For instance, a calibrated offset term can be used to ensure that the command setting the clutch capacity remains in excess of the actual clutch reactive torque until the actual torque passes below some threshold. An exemplary threshold for such a purpose is defined in FIG. 5 as the calibrated threshold for reactive torque. In maintaining this torque capacity request above the actual clutch reactive torque, and remembering that all devices include a reaction time to request changes, including the clutch clamping mechanism, the delay in the change to torque capacity in response to clutch command changes in combination with this offset term will maintain the torque capacity in excess of the actual clutch reactive torque. Additionally, another threshold, a calibrated threshold for torque estimate, can be used to define the end of the torque phase. For instance, if an estimate of the clutch torque capacity, as determined by an algorithm modeling clutch operation, stays below this threshold through a calibrated period of time, then the clutch can be determined to be in an unlocked state.

FIG. 6 is a graphical representation of torque terms associated with a clutch through an exemplary transitional locking state, in accordance with the present disclosure. As described above, within many transmission shift events, a second clutch is synchronized and locked, and torque is applied to the clutch. Lines illustrated at the left extreme of the graph depict clutch operation in an unlocked state. The initiation of locking state requires a series of subordinate commands necessary to transition the clutch from an unlocked state to a locked state. As described above in relation to a transition to a second torque phase within a transmission shift, the clutch, including the shaft connected to the oncoming torque providing shafts and the shaft connected to the output member, must be synchronized. Once the clutch connective surfaces attached to these shafts have been attenuated and are moving at the same rotational velocity, clamping force can begin to be applied to the clutch to bring the clutch to a locked state and begin increasing the torque capacity of the clutch. As described above with regards to avoiding slip during a torque phase, clutch capacity must be increased before reactive torque to the clutch can be increased. In order to enable the application of input torques resulting in a reactive torque across the clutch as rapidly as possible, an increase in clutch capacity can be commanded anticipatorily to achieve an initial increase in clutch capacity coincident with the clutch reaching a locked state. Reactive torques, taking into account reaction times by utilizing a lead period by the method disclosed herein, can then be timely commanded with a short lag to follow increasing clutch torque capacity. An exemplary embodiment of this method, acting in reverse of the limits imposed to torque requests as described in FIG. 5, imposes limits upon the torque requests which can be issued to the engine and to the electric machine according to a calibrated ramp rate, selected to avoid slip. As depicted in FIG. 6, an clutch reactive torque immediate minimum and maximum acting as a constraint upon electric machine torque requests is increased after a calibrated lead period from the initiation of an increasing clutch reactive torque lead immediate minimum and maximum acting as a constraint upon engine torque requests. By utilizing the lead period, the increase in input torques from the engine and the electric machine increase reactive torque applied to the clutch substantially simultaneously, according to the methods disclosed herein. As the limits upon the torque generating devices are lifted according to the calibrated ramp rate applied to each limit, the HCP can command the engine and the electric machine to fulfill a portion of the reactive torque required from the clutch, each up to the respective maximum. In this way, torque requests to the engine and the electric machine are coordinated in order to compensate for reaction times in order to increase input torques from each substantially simultaneously through a shift event.

The calibrated ramp rate utilized in the above exemplary transmission shift is a selected value which will adjust input torque levels to the desired range quickly, but also will stay below the torque capacity for the clutch so as to avoid slip. The ramp rate may be developed experimentally, empirically, predictively, through modeling or other techniques adequate to accurately predict engine and electric machine operation, and a multitude of ramp rates might be used by the same hybrid powertrain, depending upon different engine settings, conditions, or operating ranges and behavior of the control system actuating the clutch torque capacity. The ramp rate used to decrease input torques in an unlocking event can but need not be an inverse of the ramp rate used to increase input torques in a locking event. Similarly, the lead period used to coordinate input torques can but need not be the same time span value utilized in both transmission transitional states and can be varied according to particular behaviors of a vehicle and its components.

As described above, during a transmission shift, for example, between two fixed gear states as defined in the exemplary transmission described above, the transmission passes through an inertia speed phase between a first torque phase and a second torque phase. During this inertia speed phase, the originally applied, off-going, clutch and the oncoming clutch to be applied are in an unlocked state, and the input is initially spinning with a rotational velocity that was shared between clutch members across the first clutch just prior to becoming desynchronized. In order to accomplish synchronization within the second clutch to be applied and loaded in the second torque phase, inputs to be connected to the second clutch must change $N_I$ to match the driveline attached through the transmission at some new gear ratio. Within a shift in a hybrid powertrain transmission, shifts can occur through an operating range state where at least one clutch is applied while another clutch is about to be transitioned to a locked state, but remains desynchronized. Operation of a transmission in a variable, non-fixed state, such as exemplary EVT Mode I and EVT Mode II described above, allows for a variable ratio of input and output speeds. Therefore, utilizing one of the EVT modes as a transitory state through an inertia speed phase, $N_I$ can be transitioned from an initial speed to a target speed while maintaining transmission of $T_O$.

An exemplary method to accomplish this synchronization through an inertia speed phase of a transmission shift is graphically depicted in FIG. 7, in accordance with the present disclosure. The effects of the transmission shift upon two terms descriptive of the shifting process are illustrated in two sections with a common timescale. The top section depicts $N_I$, initially connected through the first, initially applied clutch. The upper dotted line represents the velocity profile of $N_I$ while the first clutch is in a locked state before initiation of the shift. The bottom dotted line represents the velocity profile of $N_I$ that must be achieved to synchronize $N_I$ with the output speed of the second clutch. The transition between the two dotted lines represents the change to input speed that must take place to accomplish the shift. The bottom section of FIG. 7 depicts input acceleration ($N_{I\_DOT}$), or a derivative with respect to time of $N_I$. $N_{I\_DOT}$ is described in this case as the input acceleration immediate profile or the acceleration profile driven with a relatively quick reaction time by an electric machine or machines, and the term closely tracks actual $N_{I\_DOT}$. The input acceleration immediate profile shows the change in the rate of speed which must be accomplished in order to transition the $N_I$ from an initial $N_I$ at the synchronous state with the first clutch to a target input speed at the synchronous state with the second clutch. The initial flat portion describes the acceleration with which the input speed is increased before the initiation of the shift, and this constant value reflects the slope of the input speed in the left portion of the top section of the FIG. 7. At the time of the initiation of the shift, based upon operator input such as pedal position and algorithms within the transmission control system, including determining a preferred operating range state, a determination is made regarding target input speed that will be required to achieve synchronization and the target input acceleration profile required to produce the requisite change in $N_I$. A target input speed$_{DOT}$ based upon $N_O$ and the target operating range state after the shift is completed, can be termed an input acceleration lead predicted profile and describes the $N_{I\_DOT}$ that needs to exist after the inertia speed phase is completed. A method is disclosed to define an input acceleration immediate profile to effect changes in $N_I$ in accordance with a synchronous shift through an inertia speed phase.

A profile defining $N_{I\_DOT}$ through an inertia speed phase is confined by a number of variables. As described above, an initial $N_I$ value and $N_{I\_DOT}$ value can be monitored or described at the outset of the shift. A target input speed value and $N_{I\_DOT}$ value can be described based upon a desired operating range state, $N_O$, and a measure of powertrain operation, such as a pedal position. Constraints for the transition between the initial values and the target values include physical characteristics of the engine in response to engine commands and desired times to complete shifts. Changes to $N_I$ solely as a result of engine operation can span from wide-open throttle aggressively increasing $N_I$ to completely cutting output of the engine aggressively decreasing $N_I$. Engine commands can be modulated between these extreme engine commands for resulting changes to $N_I$ based upon desired shift characteristics. Changes to engine output can be accomplished traditionally through changes to throttle settings. However, one having skill in the art will appreciate that such throttle changes require large lead times, as described above, associated with the mechanical changes that occur when an engine receives changes in engine commands. Alternatively, in a situation where engine output needs to be modulated by some moderate amount and for a transitory period, a method is known whereby either spark timing can be retarded or fuel injection timing can be advanced to reduce engine output through a combustion cycle. While this method achieves changes to engine output more quickly than changes to throttle commands and allows for the previous output of the engine to be quickly restored, such changes reduce fuel efficiency by transferring less of the energy of combustion to work on the piston. However, in transitory periods such as a shift requiring moderate changes in $N_I$, changes to engine output through spark or injection changes can be preferable. Additionally, an electric machine or machines can be used to either boost engine output or assist in pulling down engine speed through hybrid powertrain methods described above.

Constraints for the transition between the initial values and the target values also include desired times to complete shifts. A total desired speed phase time can be defined based upon the context of powertrain operation, for example, as described by an accelerator pedal position. For instance, a shift with a fully depressed accelerator pedal (100% pedal) implies a desire by an operator to accomplish shifts and any associated decrease in $T_O$ as quickly as possible. A shift through a 0% pedal coast-down downshift implies that shift times can be relatively longer without adversely affecting drivability. Additionally, an initial input speed delta can be used to describe the degree of change in $N_I$ required to accomplish the desired shift. The initial input speed delta describes a difference between the input speed at the instant the inertia speed phase is initiated versus an input speed that would be required in at that instant if the powertrain were already in the desired operating range state. An exemplary initial input speed delta is illustrated in FIG. 7. Greater initial input speed deltas imply that greater changes to $N_I$ will need to occur through the inertia speed phase, requiring either more drastic changes to engine output or greater total desired speed phase times.

An exemplary method to set total desired speed phase time based upon accelerator pedal position and initial input speed delta includes use of a calibrated 2D look-up table. FIG. 8 illustrates in tabular form use of an exemplary 2D look-up table to determine inertia speed phase times, in accordance with the present disclosure. Accelerator pedal position and the initial $N_I$ delta allow projection of a change required in $N_I$, as describe above, which, in turn, allows estimation of an inertia speed phase time. Based upon the given inputs, an estimated inertia speed phase time can be estimated. Values of the initial $N_I$ delta in the look-up table can span positive and negative values, allowing for different calibrations according to upshifts and downshifts.

Figure 9:
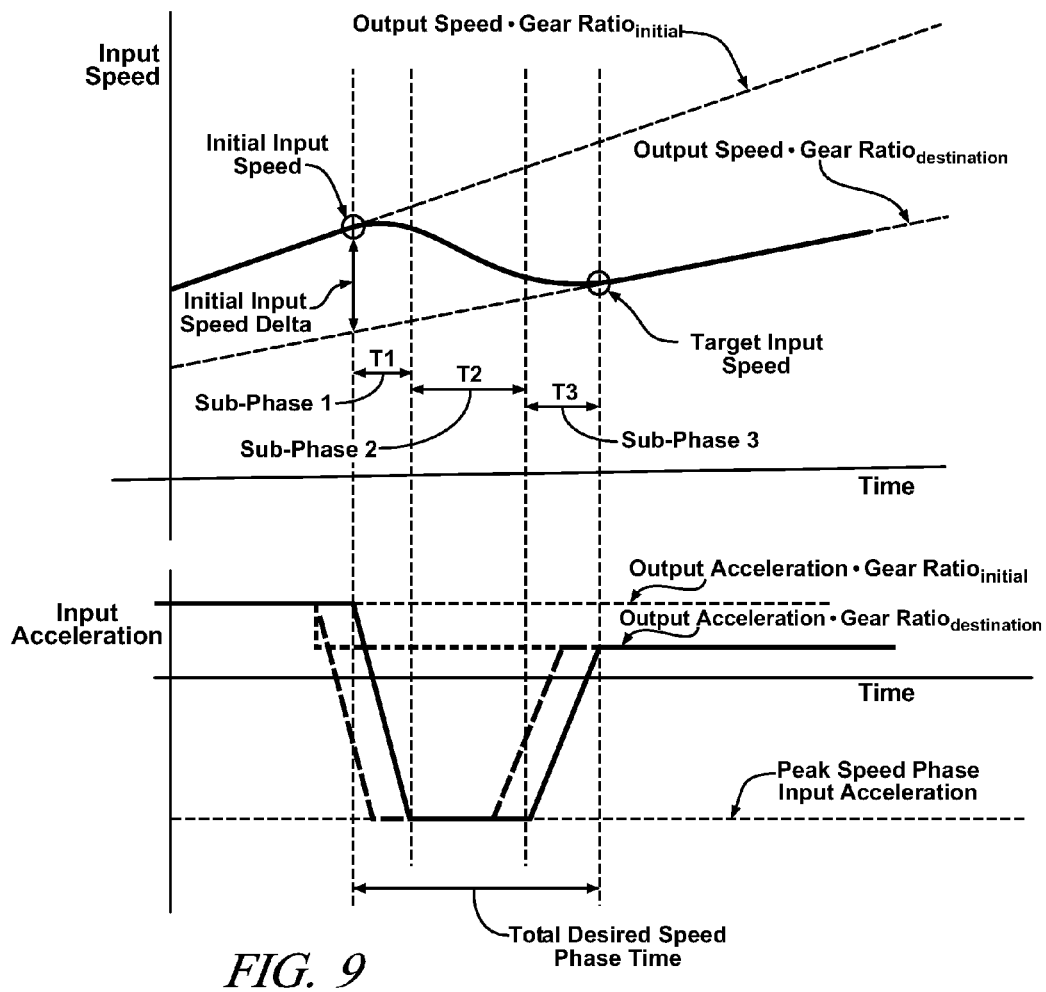
FIG. 9 describes an exemplary inertia speed phase divided into three sub-phases, in accordance with the present disclosure.

Once behavior of $N_I$ at the initiation of the inertia speed phase, behavior of a target input speed based upon a desired operating range state, and a total desired speed phase time are established, a transition described by a input acceleration immediate profile can be described. As will be appreciated based upon any comparison of $N_I$ values versus time, wherein different operating range states have different projections of $N_I$ based upon $N_O$, as is described by the dotted lines in the $N_I$ portions of FIG. 7, inertia speed phase $N_I$ curves are likely to take an S-shape, with transitory sub-phases transitioning to and from the initial and target input speed and $N_{I\_DOT}$ values and a center sub-phase linking the sub-phases. By dividing an inertia speed phase into three sub-phases, necessary transitions to an input acceleration immediate profile can be described. FIG. 9 describes an exemplary inertia speed phase divided into three sub-phases, in accordance with the present disclosure. Sub-phase 1 describes a transition from the initial $N_I$ and $N_{I\_DOT}$ values. A time $T_1$ for the sub-phase 1 or a first phase can be calculated through the following equation:

$$T_1 = K_1 * \text{TotalDesiredSpeedPhaseTime} \quad [2]$$

wherein $K_1$ is a calibration between zero and one describing a desired behavior of $N_I$. $K_1$ can be a variable term, set by indications of the context of powertrain operation describing required properties of the shift, or $K_1$ can be a fixed calibrated value. Sub-phase 3 describes a transition to the target input speed and $N_{I\_DOT}$ values. A time $T_3$ for the sub-phase 3 or a third phase can be calculated through the following equation:

$$T_3 = K_3 * \text{TotalDesiredSpeedPhaseTime} \quad [3]$$

wherein K3 is a calibration between zero and one describing a desired behavior of $N_I$ and can be set by methods similar to $K_1$. Sub-phase 2 describes a transition between sub-phases 1 and 3. A time $T_2$ or a second phase, as the remaining portion of the total desired speed phase time to be set after $T_1$ and $T_3$ are defined, can be calculated through the following equation.

$$T_2 = \text{TotalDesiredSpeedPhaseTime} - T_1 - T_3 \quad [4]$$

Sub-phase 2 is depicted as a straight line in the exemplary data of FIG. 9. It will be appreciated that a curved transition can be defined in the sub-phase 2 region depending upon the total desired speed phase time and the behavior of the exemplary powertrain. However, a straight line as depicted can be preferable. The slope of the $N_I$ curve in sub-phase 2 describes the peak speed phase input acceleration that must be achieved in order to accomplish the desired inertia speed phase in the total desired speed phase time. In the exemplary method where $N_{I\_DOT}$ through sub-phase 2 is a constant value, this peak speed phase input acceleration can be calculated through the following equations.

$$\text{PeakSpeedPhaseInputAccel.} = \frac{K_\alpha * (N_{I\_TARGET} - N_{I\_INIT})}{\text{TotalDesiredSpeedPhaseTime}} + K_\beta \quad [5]$$

$$K_\alpha = \frac{1}{1 - \frac{K_1}{2} - \frac{K_3}{2}} \quad [6]$$

$$K_\beta = K_\alpha * \frac{K_1}{2} \quad [7]$$

By describing behavior of $N_{I\_DOT}$ required through stages of the inertia speed phase, an input acceleration immediate profile can be defined to operate $N_I$ changes in an inertia speed phase.

As described above, reaction times in engines to control commands tend to be slow relative to reaction times of other components of a powertrain. As a result, engine commands issued to an engine simultaneously to an input acceleration immediate profile would include a resulting lag in changes to $N_I$. Instead, a method is additionally disclosed, wherein an input acceleration lead immediate profile is defined based upon a lead period describing the reaction time of the engine. Such a lead period can be the same lead period as calculated in equation (1) above or can be calculated separately based upon the specific behavior of the engine in an inertia speed phase. For instance, because there is no direct implication of electric machine operation in $N_{I\_DOT}$, the lead period for the input acceleration lead immediate profile can include a factor for an electric machine helping to change $N_{I\_DOT}$ more quickly than the engine could in isolation. The input acceleration lead immediate profile depicted in FIG. 7 includes a portion of the lead profile before the start of the inertia speed phase. In the case of a shift from a fixed gear state, wherein after a shift is initiated, an unlocking event in an off-going clutch must occur, the time period during the unlocking event provides a period wherein commands can be issued to the engine in advance of a desired change in $N_I$. This lead in advance of the inertia speed phase is beneficial in maintaining inertia speed phases to a total desired speed phase time, in accordance with the determinations described above. In circumstance where no or an insufficient lead period is available to allow an input acceleration lead immediate profile to effect engine changes according to the input acceleration immediate profile, an adjustment can be made to the inertia speed phase to compensate for the reaction time of the engine and the resulting lag in changes to $N_I$. Circumstances where no lead is possible includes a shift starting from an exemplary EVT mode, wherein only one clutch is initially engaged, and the inertia speed phase can start immediately upon command. In such a circumstance, the initiation of the inertia speed phase can be delayed after commands are issued to the engine in accordance with the determined lead time.

The above methods describe torque management processes as a comparison of positive values. It will be appreciated by one having ordinary skill in the art that clutch torques are described as positive and negative torques, signifying torques applied in one rotational direction or the other. The above method can be used in either positive or negative torque applications, where the magnitudes of the torques are modulated in such a way that the magnitude of the applied reactive torque does not exceed the magnitude of the torque capacity for a particular clutch.

Figure 10:
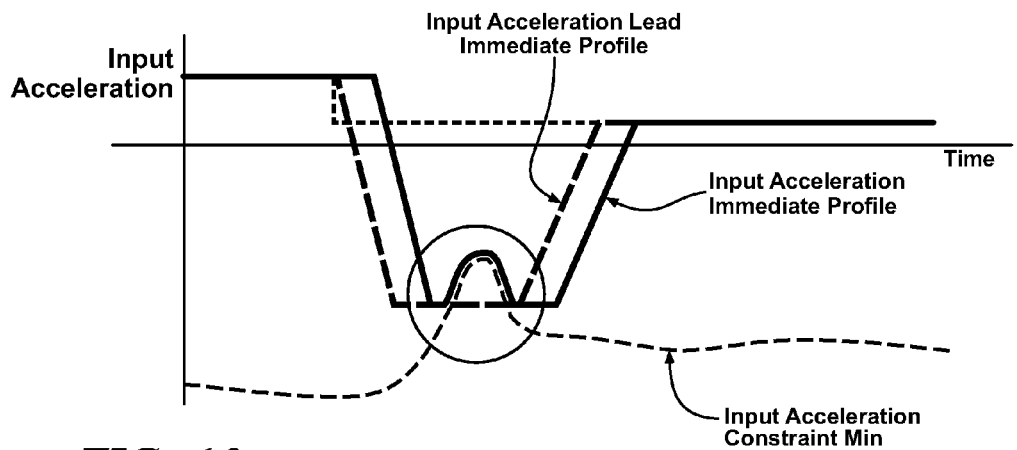
FIG. 10 is a graphical representation of an instance where a systemic restraint is imposed upon an immediate control signal, temporarily overriding max\min values set by the control signal, in accordance with the present disclosure.

FIG. 10 graphically illustrates an exemplary inertia speed phase wherein an input acceleration immediate profile is affected by imposition of a minimum input acceleration constraint in accordance with the present disclosure. In the exemplary operation of a transmission shift, an instance is depicted in which an input acceleration lead immediate profile has been determined for engine control through an inertia speed phase, and additionally, a corresponding input acceleration immediate profile has been determined for electric machine control through the inertia speed phase. Two sections are depicted in FIG. 10, including a top section depicting input speed against time and a bottom section depicting input acceleration against time, with the two sections sharing a common timescale. In an instance where negative $N_{I\_DOT}$ or deceleration is occurring to the engine in an inertia speed phase, this condition is most commonly an instance where the engine is simply being allowed to slow down by internal frictional and pumping forces within the engine. However, when an electric machine is decelerating, this condition is most commonly accomplished with the electric machine still under power, or conversely, operating in a regeneration mode. Because the electric machine is still operating under system control and with implications with the rest of powertrain's systems, the motor is still subject to systemic constraints, for instance, battery power available to drive the motor. FIG. 10 imposes such a systemic constraint in the minimum input acceleration constraint. The effect of this constraint upon input speed can be seen in the top section of the graph, wherein the straight section in the middle of the inertia speed phase is interrupted with a flattened section. Where such a constraint interferes with the input acceleration immediate, programming within the electric machine control system modify the input acceleration immediate to accommodate the constraint. In the present example, the input acceleration immediate profile is impacted by the minimum input acceleration constraint such that negative acceleration of the input speed is delayed. Once the constraint no longer limits electric machine operation within the input acceleration immediate, the control system operates to recover the $N_{I\_DOT}$ to the effect the desired changes to $N_I$.

As described above, a clutch designed for synchronous operation is frequently operated under a control scheme through which clutch torque capacity is always maintained in excess of the reactive torque transmitted through the clutch in order to avoid slip. In exemplary shifts described above, such schemes frequently unload and load clutches in isolated events, preserving the zero slip condition through each of the isolated events, removing all the reactive torque of an off-going clutch before removing clutch torque capacity.

Torque can be unloaded from an off-going clutch by applying torque through any of the torque generative devices attached to the input member. Electric machines can frequently change $T_A$ and $T_B$ quickly and efficiently. Under certain circumstances, the electric machines can apply a negative torque and act in a generator role, providing energy to an energy storage device for later use. However, torque applied by the electric machines can be limited by a number of factors, including electric machine capabilities, energy storage device limitations, and other limiting schemes operating to protect the powertrain. Engines, on the other hand, are slower to change torque applied to the input member. $T_I$ can be reduced according to a faster control method, such as changing spark or injection timing changes to temporarily reduce combustion efficiency, or changed according to a slower method, such as throttle changes. Faster engine control methods decrease effects to drivability by making more responsive changes and recover relatively quickly from the changes to $T_I$ to an original level, but decrease overall fuel efficiency. Slower engine control methods are significantly less responsive, requiring a multitude of changes within the combustion cycle of the engine to change the resulting $T_I$ from the engine. Additionally, changes to restore $T_I$ after a throttle change are similarly unresponsive to the original change, requiring a throttle change to the new setting. Changes to engine torque, either through faster engine control methods or slower engine control methods, cause changes to powertrain output and impacts to drivability. An impact of utilizing the engine to unload an off-going clutch can be expressed by the following equation.

$$\Delta T_O = \Delta T_I * GR_{INITIAL} \qquad [8]$$

As a result of these characteristics of the electric machines and engine, unloading of an off-going clutch is preferably performed by the electric machines through changes to $T_A$ and $T_B$, and in the event that the electric machines are not capable of providing sufficient torque to unload the clutch, the shift can be assisted by changes to $T_I$.

As described above, particular clutch designs, although optimally utilized in synchronous operation wherein substantially zero slip is maintained, can additionally be utilized to provide for controlled operation with some degree of slip. A method is disclosed to perform controlled asynchronous shifts through an oncoming clutch in order to provide assistance to unloading reactive torque from an off-going clutch through a torque phase. By advancing a touching state and subsequent clamping force on an oncoming clutch in an otherwise synchronous shift, as described above, a clutch torque ('$T_C$') can be utilized to affect unloading of the off-going clutch. Through the application of the oncoming clutch, power from the output member in the form of a reactive torque through the oncoming clutch can be used to negate reactive torque in the off-going clutch. As will be appreciated by one having ordinary skill in the art, this utilization of power from the output member will affect the acceleration of the output member and, therefore, will affect drivability. However, affects to drivability caused by generation of $T_C$ will frequently be less severe than affects to drivability resulting from changes to engine commands and, additionally, include none of the negative affects of commanding the engine back to normal levels after the shift. An impact of utilizing the oncoming clutch to change input speed can be expressed by the following equation.

$$\Delta T_O = \Delta T_C * (GR_{INITIAL} - GR_{DESTINATION}) \qquad [9]$$

As a result, unloading of torque from an off-going clutch according to a disclosed method is preferably affected by $T_A$ and $T_B$, then additionally by $T_C$, as needed. Offloading can additionally be affected by $T_I$ as needed in the event $T_A$, $T_B$, and $T_C$ are fully utilized.

Figure 11:
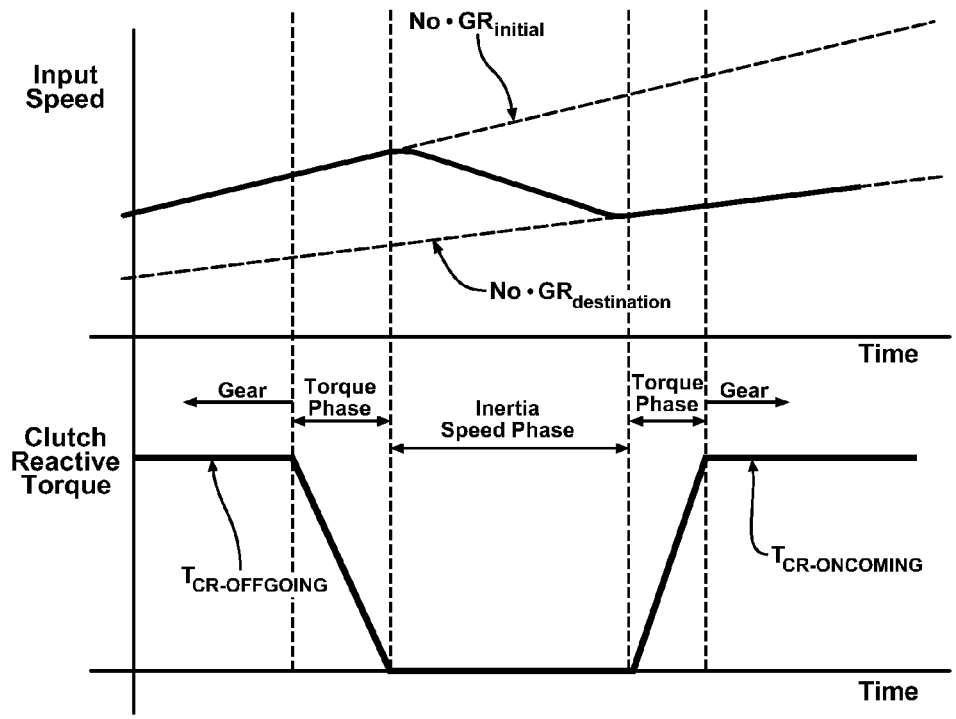
FIGS. 11 and 12 graphically contrast an exemplary synchronous shift and an asynchronous shift utilized to provide $T_C$ through the shift, in accordance with the present disclosure.
Figure 12:
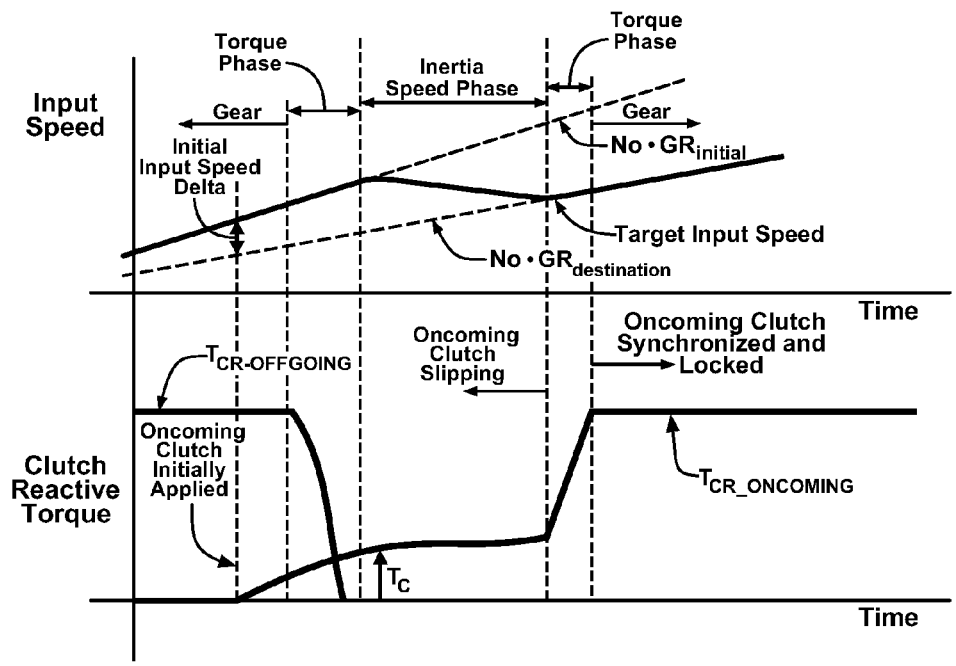

FIGS. 11 and 12 graphically contrast an exemplary synchronous shift and an asynchronous, clutch assisted shift utilized to provide $T_C$ through the shift, in accordance with the present disclosure. FIG. 11 is an exemplary synchronous shift, as described in the exemplary embodiments disclosed herein. An input speed, defined at the outset by an initially engaged gear state and described by $N_O * GR_{INITIAL}$, transitions through an inertia speed phase to a line defined by a destination gear state described by $N_O * GR_{DESTINATION}$. As described in FIG. 5 above, an off-going clutch transmitting $T_{CR-OFFGOING}$ transitions from some normally transmitted reactive torque level to zero through a torque phase. Additionally, as described in FIG. 6 above, an oncoming clutch transmitting $T_{CR-ONCOMING}$ transitions from zero to some normally transmitted reactive torque level through a second torque phase. In the period between the torque phases, an inertia speed phase takes place in which the input speed is changed from some speed set by the initial gear state to a speed set by the destination gear state. $T_O$ and $N_O$ remain largely unaffected by the changes in the inertia speed phase due to torque sustained through the transmission by a third, constantly engaged, clutch. Operated according to the methods described herein, a synchronous shift performed in this way provides for a change between engaged gears with a minimal impact to drivability.

FIG. 12 is an exemplary asynchronous shift to provide $T_C$ through the shift in order to assist offloading an off-going clutch in a torque phase. The off-going clutch transitions through a torque phase as in FIG. 11, however the oncoming clutch is applied at some stage prior to $N_I$ being changed to a target input speed. An initial input speed delta is described, showing a difference in input speed currently versus an input speed that would currently be required to be synchronized with the destination gear. The reactive clutch torque transmitted through the oncoming clutch acts as $T_C$, providing a torque that can be used through the torque phase according to methods described herein. $T_C$ can be initiated substantially synchronously with the start of the torque phase. Additionally as shown TC can be initiated before the start of the torque phase, depending upon a desired shift behavior. In this way, torque transmitted through an oncoming clutch can be utilized to assist in offloading a clutch through a torque phase.

In an torque phase in an exemplary system as described in FIG. 1 and maintaining $T_O$ through the inertia speed phase through maintaining a locked clutch in an EVT mode through the speed phase, torque in an off-going clutch and $T_O$ are related. Maintaining $N_{I\_DOT}$ through the torque phase, for example, according to a desired $N_{O\_DOT}$ and an initial fixed gear ratio, while maintaining a desired $T_O$ or $T_{O\_REQ}$ requires manipulation of other terms through the torque phase. The off-going clutch torque in a hybrid powertrain can be calculated as set forth in the following equation.

$$\begin{bmatrix} T_{CR\_OFFGOING} \\ T_O \end{bmatrix} = \begin{bmatrix} M_{11} & M_{12} \\ M_{21} & M_{22} \end{bmatrix} \begin{bmatrix} T_A \\ T_B \end{bmatrix} + \begin{bmatrix} C_1 \\ C_2 \end{bmatrix} + T_C + \begin{bmatrix} E_1 \\ E_2 \end{bmatrix} T_I \qquad [10]$$

As described above, use of electric machines to unload an off-going clutch is the preferable option. Under given operation conditions, ranges of possible $T_A$ and $T_B$ values can be determined based upon factors including electric machine torque capabilities and energy storage device charge. As described by Equation 10, when $T_A$ and $T_B$ minimum and maximum values allow, the electric machines can be used exclusively to apply a torque to reduce the off-going clutch load, thereby accomplishing offloading the clutch. However, when $T_A$ and $T_B$ are not sufficient to completely offload the off-going clutch, $T_C$ can be employed to offload the clutch. In the event $T_A$, $T_B$, and $T_C$ are insufficient to enable offloading the off-going clutch, $T_I$ can additionally be utilized to provide the necessary torque.

A control strategy to prioritize use of various torques to offload an off-going clutch is disclosed. An understanding of the torques available is important to utilizing the torque to offload the off-going clutch. Understanding $T_C$ requires quantifying the energy capacity of the oncoming clutch to provide torque through the shift. One method to accomplish this calculation of clutch energy is to assume that $T_C$ to be provided through the shift will be kept constant, calculate the energy created in the clutch through an estimated shift time, and estimate resulting clutch temperatures. A clutch torque limit ('$T_{C\_LIMIT}$') can then be determined based on estimated clutch temperature and the estimated shift time and utilized to constrain $T_C$ commands. Additionally, understanding capabilities of $T_A$ and $T_B$ requires calculation of maximum and minimum reactive torques the electric machines can create based on current system conditions and constraints. Based upon these calculations, capabilities of $T_A$, $T_B$, and $T_C$ can be determined and compared to a torque to be offloaded.

$T_C$ can only be applied in a single direction based upon the direction of clutch slip. A determination of whether $T_C$ can be allowed to assist can be performed based on clutch slip speed. If $T_C$ would result in increasing the reactive torque in the off-going clutch, then application of $T_C$ from the oncoming clutch should be disallowed.

As described above, either $T_I$ or $T_C$ can be utilized to assist offloading the off-going clutch. While use of $T_C$, if available, is typically preferable to use of $T_I$, $T_I$ can change as a result of operation of the powertrain independent of the offloading of an off-going clutch. If $T_I$ is commanded to produce torque useful in offloading the clutch, then commands to utilize $T_C$ are unnecessary. As described above, command signals to the engine are generated and tracked as lead signals. If the shift control method determines $T_C$ is appropriate for use in an upcoming shift, a lead signal is generated for the purpose of constraining portions of powertrain operation. In the event that engine commands generated for other purposes by the system will accomplish the same goal as $T_C$ or some portion of $T_C$, the engine commands can be utilized to modulate or preemptively cancel implementation of $T_C$ in the shift.

Once a required $T_C$ is determined, the control system sends a clutch torque command to clutch control algorithm, which commands a hydraulic control system fill the clutch and command proper pressure to produce the torque. Estimated clutch and engine torques are sent from separate controllers back to the HCP through CAN communication and are used, along with desired reactive torque ramping to calculate the electric machine torques.

Figure 13:
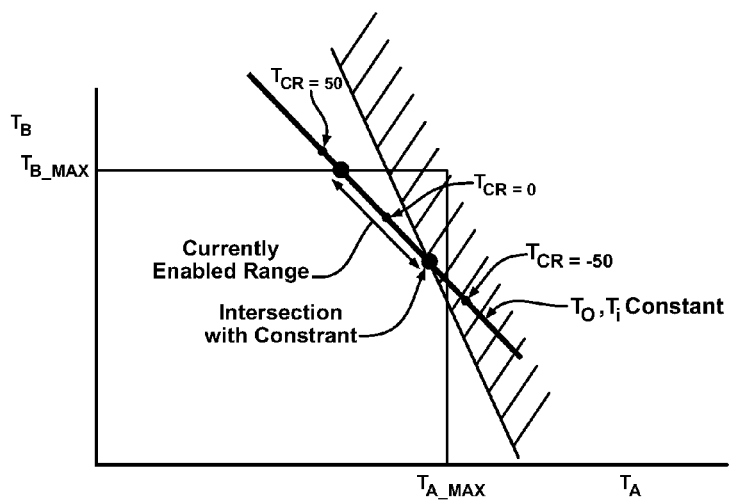
FIG. 13 graphically illustrates exemplary use of output torque terms described herein through a transmission shift, in accordance with the present disclosure.
Figure 14:
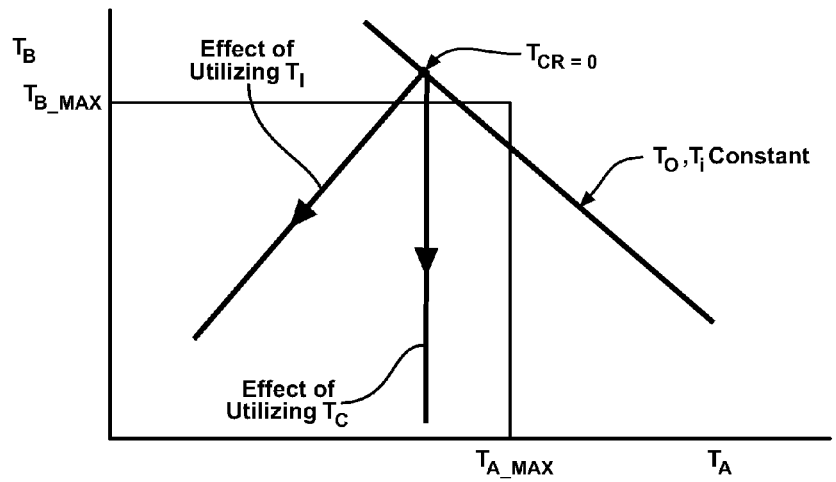
FIG. 14 graphically illustrates exemplary use of input and output torque terms including limiting terms through a transmission shift, in accordance with the present disclosure.

As described above, a determination must be made of capabilities of torques available to the system that can be utilized to offload a clutch. FIGS. 13 and 14 graphically illustrate a comparison of electric machine torques and resulting reactive torques in a clutch, in accordance with the present disclosure. In a powertrain wherein only electric machine torques and an input torque generate output torque, $T_O$ can be expressed by the following equation.

$$T_O = M_{21} * T_A + M_{22} * T_B + E_2 T_I \qquad [11]$$

Constants M and E describe the relationship of $T_O$ of each of the other torques for a given clutch, dictated by the operating range state of the transmission, and are determinable by methods known in the art. Treating $T_I$ and $T_O$ as constants, lines depicting clutch reactive torque across the clutch ('$T_{CR}$') can be depicted in a $T_A$ versus $T_B$ domain. Equation 11 can then be reduced to the following equation:

$$T_{CR} = M_{11} * T_A + M_{12} * T_B + C \qquad [12]$$

wherein C is a constant based upon the effect of $T_I$. In exemplary data wherein a $T_{CR}=0$ can be depicted within a range defined by achievable $T_{A\_MAX}$ and $T_{B\_MAX}$, $T_A$ and $T_B$ values can be given that will offload or remove $T_{CR}$ from the clutch. FIG. 13 depicts such exemplary data in a $T_A$ and $T_B$ space wherein, for a given $T_I$ and $T_O$ values, a $T_{CR}=0$ point is depicted within a region bounded by $T_{A\_MAX}$ and $T_{B\_MAX}$ values. In exemplary data wherein $T_{CR}=0$ cannot be depicted within a range defined by achievable $T_{A\_MAX}$ and $T_{B\_MAX}$, no achievable $T_A$ and $T_B$ values exist that will offload or remove $T_{CR}$ from the clutch solely through $T_A$ and $T_B$.

It will be appreciated that within a hybrid powertrain, constraints frequently restrict the application of torque by the various torque generative devices. For example, battery power limits or thermal limits in the electric machines can limit the application of $T_A$ and $T_B$. FIG. 13 graphically depicts, through the hashed line, a limit upon electric machine torques that can be applied. Any of the methods described herein to determine torques that can accomplish offloading an off-going clutch must additionally conform to constraints such as the one depicted. The intersection of the line whereon $T_I$ and $T_O$ are constant with the constraint defines within the $T_A$ and $T_B$ space wherein an operational range is currently enabled.

FIG. 14 depicts such exemplary data wherein, for a given $T_I$ and $T_O$ values, a $T_{CR}=0$ point is depicted within a region bounded by $T_{A\_MAX}$ and $T_{B\_MAX}$ values. However, in light of the relationship described in Equation 10, application of $T_C$ by methods described herein can change conditions under which $T_{CR}=0$. FIG. 14 depicts a line along which a resulting $T_{CR}$ value moves in the depiction with increasing application of $T_I$ and also depicts a line along which a resulting $T_{CR}$ value moves in the depiction with increasing application of $T_C$ in the correct direction. By sufficient application of $T_C$, $T_{CR}$ can be reduced to zero within the zone bounded by $T_{A\_MAX}$ and $T_{B\_MAX}$ values. In this way, $T_A$, $T_B$, and $T_C$ can be utilized cooperatively to offload an off-going clutch.

Figure 15:
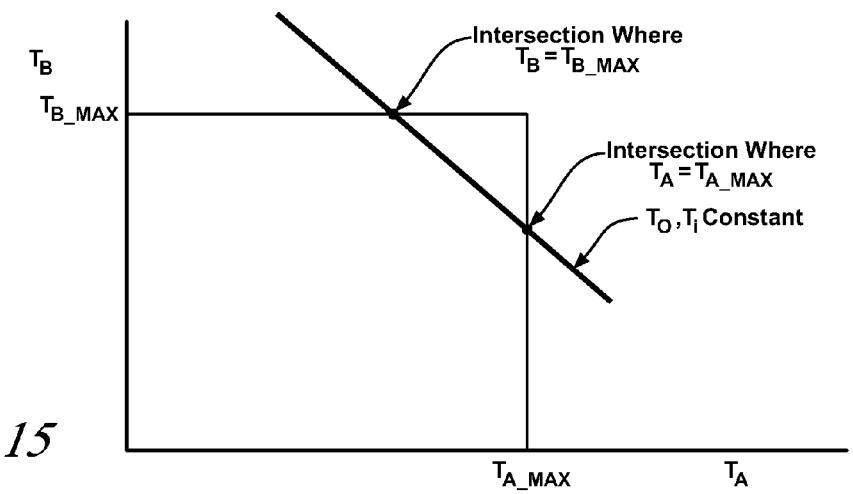
FIG. 15 illustrates an exemplary process by which a powertrain in controlled through an inertia speed phase, utilizing oncoming clutch torque to maintain an output torque, in accordance with the present disclosure.

The relationship of $T_A$ and $T_B$ to $T_{CR}$ as depicted in FIGS. 13 and 14 can be utilized to determine whether $T_C$ is required to offload a clutch. FIG. 15 graphically depicts an exemplary method to determine whether $T_A$ and $T_B$ can offload a clutch without any assistance, in accordance with the present disclosure. Given a line as described above wherein $T_I$ and $T_O$ are constants, Equation 12 can be utilized to calculate the minimum and maximum $T_{CR}$ values within the permissible operating torque area subject to the battery power and machine limits. Given calculation of both points, a determination can be made whether $T_{CR}=0$ falls between these two points and is therefore bounded by $T_{A\_MAX}$ and $T_{B\_MAX}$ values by looking at the signs of the two values. If one value is positive and the other is negative, then $T_{CR}=0$ is between the two points and is enclosed by the two extremities. If both values are positive or negative, then $T_{CR}=0$ is not enclosed by the two extremities. In this way, it is possible to determine whether $T_A$ and $T_B$ can offload a clutch, or whether $T_C$ can be utilized to assist such a shift.

FIG. 15 describes a function made possible by analyzing $T_{CR}$ values, in particular the signs of the $T_{CR}$ values, at the boundaries of $T_A$ and $T_B$ capacities. However, the magnitudes of the values can be useful to defining a $T_{CR}$ that, at minimum, must be offloaded from the clutch by $T_C$. The lesser in magnitude of the absolute values of the $T_{CR}$ values at $T_A=T_{A\_MAX}$ and $T_B=T_{B\_MAX}$ can be utilized to determine the balance of $T_{CR}$, at minimum, that must be provided by $T_C$ in order to offload the clutch.

As described above, $T_{C\_LIMIT}$ must be calculated to determine based upon energy created in the clutch a limit that will keep the clutch from exceeding temperatures that would damage the clutch. $T_{C\_LIMIT}$ is depicted, describing an energy limit upon the clutch. Such an energy limit can be described by the following equation.

$$TotalClutchEnergy = \int_0^{EndofClutchAssistedShift} T_{C\_LIMIT} * N_C * dt \quad [13]$$

An understanding or calibration of allowable clutch energy through a shift event allows a description of $T_{C\_LIMIT}$ as a limit to $T_C$ that can be applied. While this disclosure deals primarily with utilizing $T_C$ through the torque phase, it will be appreciated that in a shift event as depicted in the exemplary shift of FIG. 12, energy in the clutch must be managed throughout the shift event. For the purpose of determining a limit to $T_C$ through the torque phase portion of the shift event, a constant value for $T_{C\_LIMIT}$ can be assumed, such that limiting $T_C$ below throughout a torque phase will ensure that the energy limit of the clutch is not violated. Assuming a constant or nearly constant $N_C$ profile in the oncoming clutch through the torque phase supporting substantially constant $T_C$, $T_{C\_LIMIT}$ can be calculated through the following equation.

$$T_{C\_LIMIT} = \frac{2 * TotalClutchEnergy}{N_C * TorquePhaseTime} \quad [14]$$

Utilizing $T_{C\_LIMIT}$, a limit can be set to $T_C$ such that the energy limit of the clutch will not be exceeded. $T_C$ commands can be therefore be selected in an exemplary method by selecting the minimum of a $T_C$ required to unload the clutch based upon $T_{CR}$ values at $T_A=T_{A\_MAX}$ and $T_B=T_{B\_MAX}$ and $T_{C\_LIMIT}$.

Figure 16:
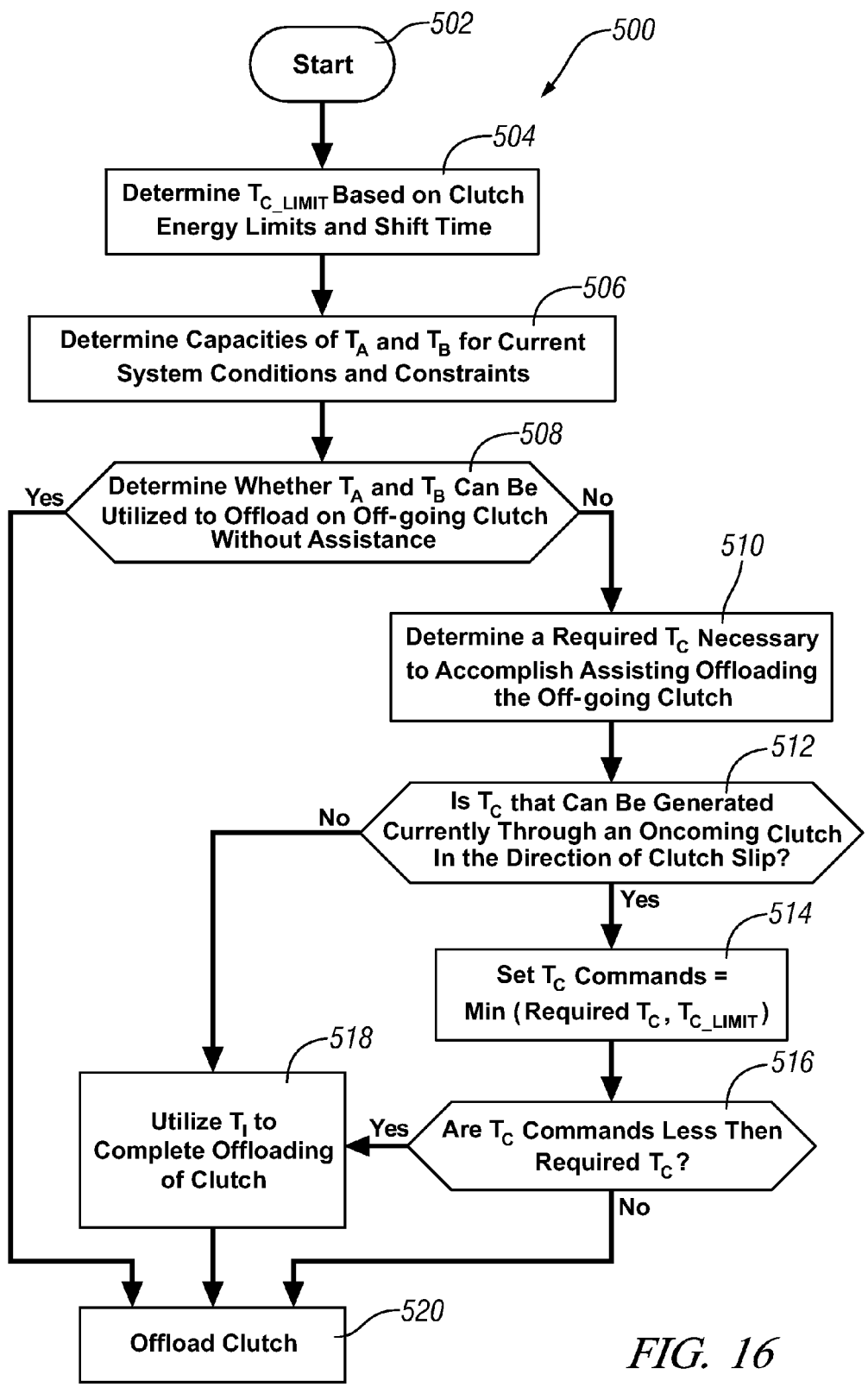
FIG. 16 illustrates an exemplary process by which an off-going clutch can be offloaded, in accordance with the present disclosure.

FIG. 16 illustrates an exemplary process by which an off-going clutch can be offloaded, in accordance with the present disclosure. Process 500 begins at step 502. In step 504, a $T_{C\_LIMIT}$ is determined based upon clutch energy limits and a shift time, in particular, a torque phase time and a speed phase time. In step 506, capacities of $T_A$ and $T_B$ are determined. In step 508, the capacities of $T_A$ and $T_B$ determined in step 506 are utilized by methods described herein to determine whether $T_A$ and $T_B$ can be utilized to fully offload an off-going clutch without assistance. If the clutch can be offloaded without assistance, then the process proceeds to step 520. If the clutch cannot be offloaded without assistance, then the process proceeds to step 510. In step 510, a required $T_C$ necessary to accomplish assisting unloading of the off-going clutch is determined. In step 512, $T_C$ is examined and compared to $N_C$. If $T_C$ that can be generated through an oncoming clutch is in the same direction as $N_C$, then the process proceeds to step 514. If $T_C$ that can be generated through an oncoming clutch is not in the same direction as $N_C$, then the process proceeds to step 518. In step 514, $T_C$ commands to utilize the oncoming clutch to assist in offloading the off-going clutch are determined according to the required $T_C$ determined in step 510 and the constraint of $T_{C\_LIMIT}$ determined in step 504. In step 516, the $T_C$ commands generated in step 514 are compared to the $T_C$ required to assist in offloading the clutch. If the $T_C$ commands are sufficient to assist in offloading the clutch, then the process proceeds to step 520. If the $T_C$ commands are not sufficient to assist in offloading the clutch, then the process proceeds to step 518. At step 518, any torque required to offload the clutch that cannot be provided by $T_A$, $T_B$, and $T_C$ is commanded in $T_I$. In step 520, the clutch is offloaded according to methods described herein.

Figure 17:
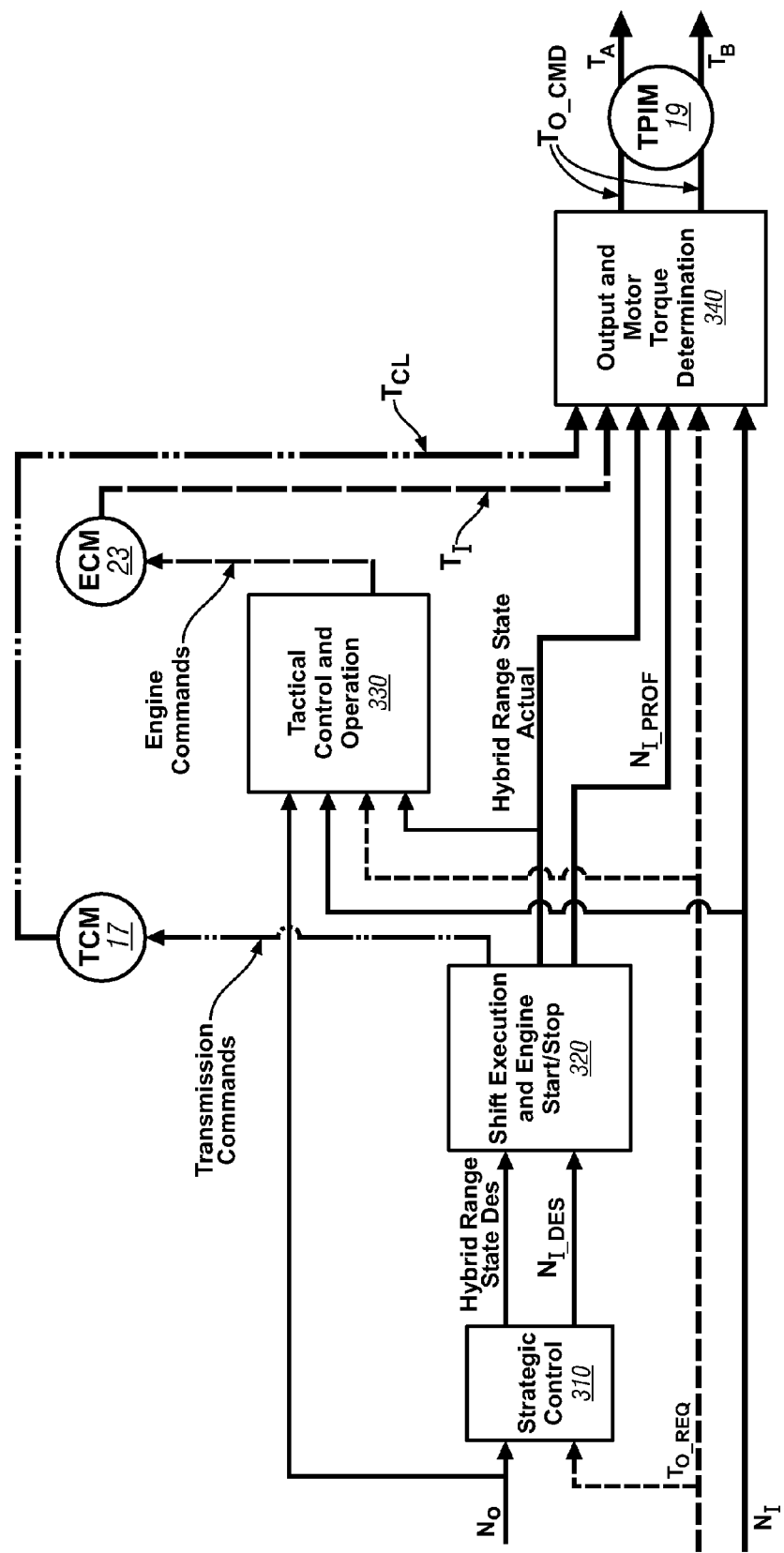
FIG. 17 shows an exemplary control system architecture for controlling and managing torque and power flow in a powertrain system having multiple torque generative devices and residing in control modules in the form of executable algorithms and calibrations, in accordance with the present disclosure.

FIG. 17 shows a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 17 depicts a flow of pertinent signals through the control modules. In operation, the operator inputs to the accelerator pedal 113 and the brake pedal 112 are monitored to determine the operator torque request ('$T_{O\_REQ}$'). Operation of the engine 14 and the transmission 10 are monitored to determine the input speed ('$N_I$') and the output speed ('$N_O$'). A strategic optimization control scheme ('Strategic Control') 310 determines a preferred input speed ('$N_{I\_DES}$') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('$N_{I\_PROF}$') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('$T_{CL}$') for each clutch is estimated in the TCM 17, including the presently applied clutches and the non-applied clutches, and a present engine input torque ('$T_I$') reacting with the input member 12 is determined in the ECM 23. A motor torque control scheme ('Output and Motor Torque Determination') 340 is executed to determine the preferred output torque from the powertrain ('$T_{O\_CMD}$'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

Figures 18, 18A:
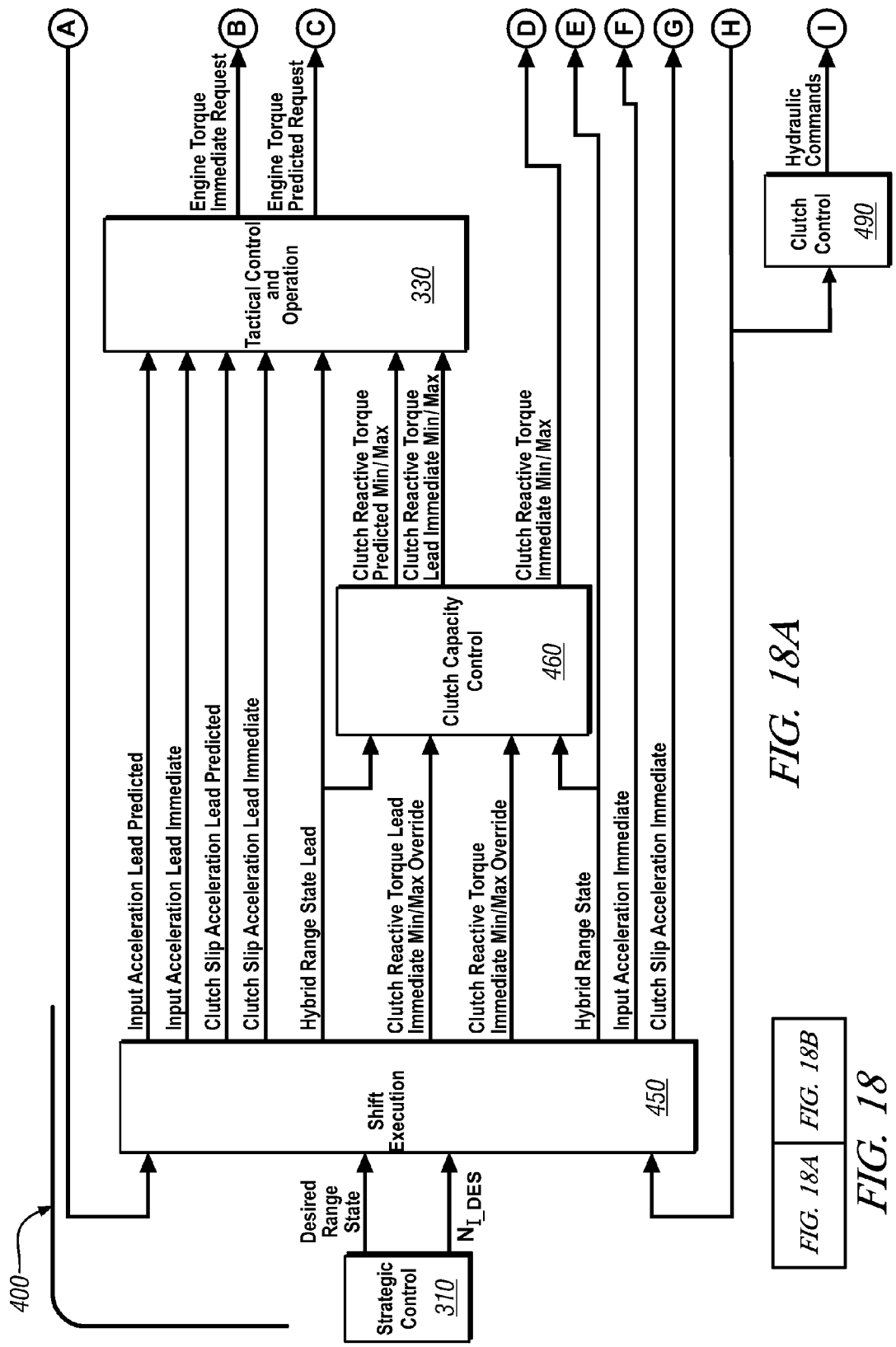
FIG. 18 is a schematic diagram exemplifying data flow through a shift execution, describing more detail exemplary execution of the control system architecture of FIG. 17 in greater detail, in accordance with the present disclosure.
Figure 18B:
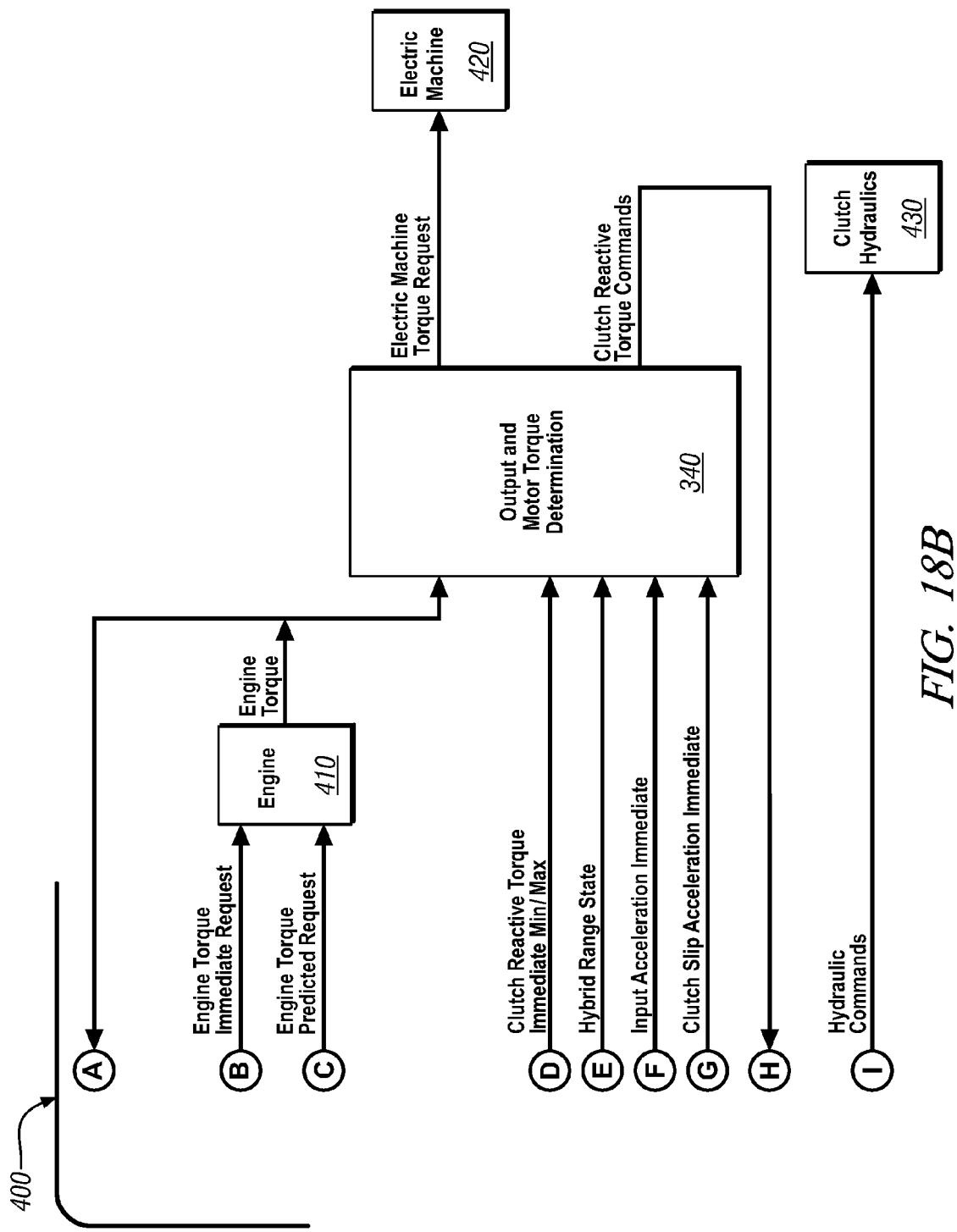

FIG. 18 is a schematic diagram exemplifying data flow through a shift execution, describing more detail exemplary execution of the control system architecture such as the system of FIG. 17 in greater detail, in accordance with the present disclosure. Powertrain control system 400 is illustrated comprising several hybrid drive components, including an engine 410, an electric machine 420, and clutch hydraulics 430. Control modules strategic control module 310, shift execution module 450, clutch capacity control module 460, tactical control and operation module 330, output and motor torque determination module 340, and clutch control module 490, are illustrated, processing information and issuing control commands to engine 410, electric machine 420, and clutch hydraulics 430. These control modules can be physically separate, can be grouped together in a number of different control devices, or can be entirely performed within a single physical control device. Module 310, a strategic control module, performs determinations regarding preferred powertrain operating points and preferred operating range states as described in FIG. 17. Module 450, a shift execution module, receives input from strategic control module 310 and other sources regarding shift initiation. Module 450 processes inputs regarding the reactive torque currently applied to the clutch and the preferred operating range state to be transitioned to. Module 450 then employs programming, determining parameters for the execution of the shift, including hybrid range state parameters describing the balance of input torques required of the torque providing devices, details regarding a target input speed and input acceleration lead predicted required to execute the transition to the preferred operating range state, an input acceleration lead immediate as previously described, and clutch reactive torque lead immediate minimum and maximum and clutch reactive torque immediate minimum and maximum values as previously described. From module 450, clutch reactive torque parameters and hybrid range state information are fed to clutch capacity control module 460, lead control parameters and signals are fed to tactical control and operation module 330, and immediate control parameters and signals are fed to output and motor torque determination module 340. Clutch capacity control module 460 processes reactive torque and hybrid range state information and generates logic describing clutch reactive torque limits enabling engine control through module 330, electric machine control through module 340, and clutch control through module 490, in accordance with methods described herein. Tactical control and operation module 330 includes means to issue torque requests and execute limits upon input torque supplied from engine 410, and feed, additionally, describe the input torque supplied from the engine to module 340 for use in control of electric machine 420. Output and motor torque determination module 340 likewise receives and processes information to issue electric machine torque requests to electric machine 420. Additionally, module 340 generates clutch reactive torque commands for use by clutch control module 490. Module 490 processes information from modules 460 and 340 and issues hydraulic commands in order to achieve the required clutch torque capacity required to operate the transmission. This particular embodiment of data flow illustrates one possible exemplary process by which a vehicular torque generative devices and related clutches can be controlled in accordance with the method disclosed herein. It will be appreciated by one having ordinary skill in the art that the particular process employed can vary, and this disclosure is not intended to limited to the particular exemplary embodiment described herein.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain comprising an electro-mechanical transmission mechanically-operatively coupled to an internal combustion engine and an electric machine adapted to selectively transmit mechanical power to an output member, said method comprising:
   commanding a shift from a first operating range state to a second operating range state;
   identifying an off-going clutch;
   controlling torque output from said electric machine to offload reactive torque transmitted through said off-going clutch;
   selectively applying an oncoming clutch to offload reactive torque transmitted through said off-going clutch; and
   reducing a clutch torque capacity of said off-going clutch when said reactive torque transmitted through said off-going clutch is substantially zero.

2. The method of claim 1, further comprising controlling torque output from a second electric machine to off-load reactive torque transmitted through said off-going clutch.

3. The method of claim 1, wherein selectively applying said oncoming clutch is based upon a torque required to assist said electric machine to fully offload reactive torque transmitted through said off-going clutch.

4. The method of claim 3, further comprising applying an engine torque based upon a torque required to assist said electric machine and said oncoming clutch to fully offload reactive torque transmitted through said off-going clutch.

5. The method of claim 1, wherein selectively applying said oncoming clutch is based upon determining that said oncoming clutch will reduce reactive torque in said off-going clutch.

6. The method of claim 5, wherein determining that said oncoming clutch will reduce reactive torque in said off-going clutch is based upon monitoring slip speed in said oncoming clutch.

7. The method of claim 1, wherein selectively applying said oncoming clutch is based upon determining a clutch energy limit and limiting said applying said oncoming clutch based upon said clutch energy limit.

8. Method for controlling a powertrain comprising an electro-mechanical transmission mechanically-operatively coupled to an internal combustion engine and an electric machine adapted to selectively transmit mechanical power to an output member, said method comprising:
  initiating a shift event comprising
    identifying an off-going clutch to be synchronously off-loaded, and
    identifying an oncoming clutch to be loaded;
  monitoring an electric machine torque capability to offload said off-going clutch;
  determining a torque required to assist said electric machine to offload said off-going clutch;
  applying torque with said electric machine to offload said off-going clutch; and
  selectively applying torque through said oncoming clutch based upon said torque required to assist said electric machine to offload said off-going clutch.

9. The method of claim 8,
  wherein monitoring an electric machine torque capability to offload said off-going clutch comprises
    monitoring a torque capability for said electric machine, and
    monitoring a torque capability of a second electric machine; and
  further comprising applying torque with said second electric machine to offload said off-going clutch.

10. The method of claim 8, further comprising:
  determining a torque required to assist said electric machine and said oncoming clutch to offload said off-going clutch; and
  applying torque with said engine based upon said determining said torque required to assist said electric machine and said oncoming clutch to offload said off-going clutch.

11. The method of claim 8, further comprising:
  determining a clutch energy limit based upon intended operation of said oncoming clutch; and
  wherein said selectively applying torque through said oncoming clutch is further based upon said clutch energy limit.

12. Apparatus for controlling a powertrain comprising an electro-mechanical transmission mechanically-operatively coupled to an internal combustion engine and an electric machine adapted to selectively transmit mechanical power to an output member, said apparatus comprising:
  an identified off-going clutch;
  an identified oncoming clutch; and
  a powertrain control system including programming to
    monitor a torque capability of said electric machine to offload reactive torque from said off-going clutch,
    determine a torque required to assist said electric machine to offload said off-going clutch,
    command torque from said electric machine to offload said off-going clutch, and
    selectively command torque through said oncoming clutch based upon said torque required to assist said electric machine to offload said off-going clutch.

13. The apparatus of claim 12, wherein said powertrain control system further includes programming to
  monitor a torque capability of a second electric machine to offload reactive torque from said off-going clutch, and
  command torque from said second electric machine to offload said off-going clutch.

14. The apparatus of claim 12, wherein said powertrain control system further includes programming to
  determine a torque required to assist said electric machine and said oncoming clutch to offload said off-going clutch, and
  command torque from said engine based upon said determining said torque required to assist said electric machine and said oncoming clutch to offload said off-going clutch.

15. The apparatus of claim 12, wherein said powertrain control system further includes programming to
  determine a clutch energy limit based upon intended operation of said oncoming clutch, and
  limit said selectively commanded torque through said oncoming clutch based upon said clutch energy limit.

* * * * *